(12) United States Patent
Broussard

(10) Patent No.: US 7,571,389 B2
(45) Date of Patent: Aug. 4, 2009

(54) SYSTEM, COMPUTER-READABLE STORAGE DEVICE, AND METHOD FOR COMBINING THE FUNCTIONALITY OF MULTIPLE TEXT CONTROLS IN A GRAPHICAL USER INTERFACE

(75) Inventor: Scott J. Broussard, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1835 days.

(21) Appl. No.: 09/870,621

(22) Filed: May 31, 2001

(65) Prior Publication Data

US 2002/0180792 A1 Dec. 5, 2002

(51) Int. Cl.
*G06F 3/00* (2006.01)
(52) U.S. Cl. ...................... 715/762; 715/760
(58) Field of Classification Search ............. 713/183, 713/184, 202, 784; 705/18; 700/237; 715/762, 715/749, 748, 760
See application file for complete search history.

(56) References Cited

U.S. PATENT DOCUMENTS

| | | | |
|---|---|---|---|
| 4,951,229 A | 8/1990 | DiNicola et al. | |
| 5,146,593 A | 9/1992 | Brandle et al. | |
| 5,327,529 A | 7/1994 | Fults et al. | |
| 5,550,563 A | 8/1996 | Matheny et al. | |
| 5,600,776 A | 2/1997 | Johnson et al. | |
| 5,604,516 A * | 2/1997 | Herrod et al. ............... 345/168 |
| 5,604,896 A | 2/1997 | Duxbury et al. | |
| 5,734,597 A | 3/1998 | Molnar et al. | |
| 5,805,167 A | 9/1998 | van Cruyningen | |
| 5,819,091 A | 10/1998 | Arendt et al. | |
| 5,909,684 A | 6/1999 | Nelson | |
| 5,933,144 A | 8/1999 | Alcorn | |
| 5,946,487 A | 8/1999 | Dangelo | |
| 5,974,256 A | 10/1999 | Matthews et al. | |
| 5,991,534 A | 11/1999 | Hamilton et al. | |
| 6,003,050 A | 12/1999 | Silver et al. | |
| 6,005,568 A | 12/1999 | Simonoff et al. | |
| 6,005,588 A | 12/1999 | Guha | |

(Continued)

OTHER PUBLICATIONS

WinZip Computing Inc., WinZip 8.0, 1991-2000, attacted pages.*

(Continued)

*Primary Examiner*—Dennis Bonshock
(74) *Attorney, Agent, or Firm*—Jill Poimboeuf; Daffer McDaniel, LLP

(57) ABSTRACT

A system and method are disclosed whereby two components within the Swing application program interface (API), JTextField and JPasswordField, are used to emulate the behavior of the TextField component in the abstract windowing toolkit (AWT). This allows legacy Java applications, based on the AWT, to be migrated to the platform-independent Swing API, without modification. In the AWT, a single TextField component could be used for ordinary text entry, as well as for password protected text entry. In the latter case, a prescribed echo character would be displayed as text was entered, to avoid displaying privileged information. According to the system and method disclosed herein, a JPasswordField component may be substituted for a JTextField component, or vice-versa, depending on whether an echo character has been specified. This substitution is performed at runtime, using an enhanced version of the Swing API, as disclosed herein. The enhanced version of Swing is referred to herein as AWTSwing.

25 Claims, 9 Drawing Sheets

U.S. PATENT DOCUMENTS

| | | | |
|---|---|---|---|
| 6,011,916 | A | 1/2000 | Moore et al. |
| 6,023,271 | A | 2/2000 | Quaeler-Bock et al. |
| 6,029,000 | A | 2/2000 | Woolsey et al. |
| 6,049,329 | A | 4/2000 | Zetts et al. |
| 6,064,382 | A | 5/2000 | Diedrich et al. |
| 6,066,181 | A | 5/2000 | DeMaster |
| 6,083,276 | A | 7/2000 | Davidson et al. |
| 6,085,120 | A | 7/2000 | Schwerdtfeger et al. |
| 6,128,011 | A | 10/2000 | Peng |
| 6,134,661 | A * | 10/2000 | Topp ..................... 713/200 |
| 6,161,107 | A | 12/2000 | Stern |
| 6,191,790 | B1 | 2/2001 | Bogdan |
| 6,269,475 | B1 | 7/2001 | Farrell et al. |
| 6,323,865 | B1 | 11/2001 | Colletti |
| 6,380,955 | B1 | 4/2002 | Kanungo et al. |
| 6,415,303 | B1 * | 7/2002 | Meier et al. .............. 715/500.1 |
| 6,434,694 | B1 | 8/2002 | Slaughter et al. |
| 6,496,202 | B1 | 12/2002 | Prinzing |
| 6,522,341 | B1 | 2/2003 | Nagata |
| 6,522,343 | B2 | 2/2003 | Sobeski et al. |
| 6,549,218 | B1 | 4/2003 | Gershony et al. |
| 6,563,960 | B1 | 5/2003 | Chan et al. |
| 6,634,022 | B1 | 10/2003 | Leermakers |
| 6,675,230 | B1 | 1/2004 | Lewallen |
| 6,675,371 | B1 | 1/2004 | York et al. |
| 6,701,420 | B1 | 3/2004 | Hamilton et al. |
| 6,727,918 | B1 | 4/2004 | Nason |
| 6,789,254 | B2 | 9/2004 | Broussard |
| 6,918,093 | B2 | 7/2005 | Broussard |
| 6,957,391 | B2 | 10/2005 | Broussard |
| 6,993,773 | B2 | 1/2006 | Broussard |
| 2002/0180787 | A1 | 12/2002 | Broussard |
| 2002/0180790 | A1 | 12/2002 | Broussard |
| 2002/0180791 | A1 | 12/2002 | Broussard |
| 2002/0180793 | A1 | 12/2002 | Broussard |
| 2002/0191018 | A1 | 12/2002 | Broussard |
| 2003/0110024 | A1 | 6/2003 | Broussard |

OTHER PUBLICATIONS

Sun Microsystems, Java Platform 1.2 Beta 4 API Specification: Class JPasswordField, 1993-1998, p. 1.*
Sun Microsystems, Java Platform 1.2 Beta 4 API Specification: Class JTextField, 1993-1998, p. 1.*
Sun Microsystems, The Swing Connection, Feb. 1998, vol. 3, No. 4, swing version 1.0.*
Wilson, Platform Performance: Strategies and Tatics, Chapter 10, Aug. 2000, pp. 145-159.
Microsoft Computer Dictionary, 5th Edition, 2002, pp. 13, 33, 295, 505.
Nelson, Java Foundation Classes, 1998, pp. xxv-xxvii, 20-22, 43, 73-79, 472-481, 694-707.
Muller et al., "Java Foundation Classes (aka "Swing") Component Architecture," Sun Microsystems, 1998, pp. 1-14.
"Swing Short Course, Part I," MageLang Institute, 1997, pp. 1-42.
Java Platform 1.2 API Specification: Class LookAnd Feel, Sun Microsystems, 1998, pp. 1-7.
Liang, "Rapid Java Application Development Using JBuilder 3," 2000, pp. 167-169.
"The AWT Native Interface," Sun Microsystems, 1999, pp. 1-12.
Curtis, "Java, RMI and Corba," Object Management Group, 1997, pp. 1-7.
"Distributed Application Management using Jini Connection Technology," Sun Microsystems, 2000, pp. 1-15.
"Support for Extensions and Applications in the Version 1.2 of the Java Platform," Sun Microsystems, 1998, pp. 1-11.
Husaini, "Using Java Native Interface," ACM Crossroads Student Magazine, Jan. 2001, pp. 1-11.
Nigam et al, "Platform Independent Tool for Designing Quality Graphical User Interfaces," IEEE, 1997, pp. 54-61.
Begole et al., "Transparent Sharing of Java Applets: A Replicated Approach," ACM, 1997, pp. 55-64.
Abdel-Wahab et al., "An Internet Collaborative Environment for Sharing Java Application," IEEE, 1997, pp. 112-117.
Office Action mailed Nov. 23, 2003 for U.S. Appl. No. 09/870,622.
Final Office Action mailed May 27, 2004 for U.S. Appl. No. 09/870,622.
Notice of Allowance mailed Jul. 31, 2008 for U.S. Appl. No. 09/870,622.
Office Action mailed Mar. 15, 2004 for U.S. Appl. No. 09/870,613.
Final Office Action mailed Nov. 16, 2004 for U.S. Appl. No. 09/870,613.
Office Action mailed Feb. 13, 2004 for U.S. Appl. No. 09/870,620.
Final Office Action mailed Sep. 9, 2004 for U.S. Appl. No. 09/870,620.
Notice of Allowance mailed Jul. 31, 2008 for U.S. Appl. No. 09/870,620.
Office Action mailed Jan. 15, 2004 for U.S. Appl. No. 09/870,615.
Final Office Action mailed Jan. 15, 2004 for U.S. Appl. No. 09/870,615.
Notice of Allowance mailed Mar. 3, 2005 for U.S. Appl. No. 09/870,615.
Office Action mailed Jan. 29, 2004 for U.S. Appl. No. 09/870,614.
Final Office Action mailed Aug. 13, 2004 for U.S. Appl. No. 09/870,614.
Notice of Allowance mailed Jul. 31, 2008 for U.S. Appl. No. 09/870,614.
Office Action mailed Jan. 29, 2004 for U.S. Appl. No. 09/870,624.
Office Action mailed Aug. 13, 2004 for U.S. Appl. No. 09/870,624.
Final Office Action mailed Feb. 22, 2005 for U.S. Appl. No. 09/870,624.
Notice of Allowance mailed Jul. 31, 2008 for U.S. Appl. No. 09/870,624.
Office Action mailed Nov. 10, 2004 for U.S. Appl. No. 09/870,612.
Office Action mailed Jun. 14, 2005 for U.S. Appl. No. 09/870,612.
Notice of Allowance mailed Oct. 3, 2005 for U.S. Appl. No. 09/870,612.
Office Action mailed Feb. 10, 2004 for U.S. Appl. No. 09/870,611.
Office Action mailed Oct. 5, 2004 for U.S. Appl. No. 09/870,611.
Notice of Allowance mailed May 5, 2005 for U.S. Appl. No. 09/870,611.
Office Action mailed Oct. 3, 2003 for U.S. Appl. No. 09/885,995.
Office Action mailed Feb. 12, 2004 for U.S. Appl. No. 09/885,995.
Notice of Allowance mailed Aug. 25, 2004 for U.S. Appl. No. 09/885,995.
Notice of Allowance mailed May 4, 2004 for U.S. Appl. No. 09/886,002.
Decision on Appeal mailed Mar. 31, 2008 for U.S. Appl. No. 09/870,622.
Decision on Appeal mailed Mar. 31, 2008 for U.S. Appl. No. 09/870,620.
Decision on Appeal mailed Mar. 31, 2008 for U.S. Appl. No. 09/870,614.
Decision on Appeal mailed Mar. 31, 2008 for U.S. Appl. No. 09/870,624.
Appeal Decision mailed Nov. 24, 2008 for U.S. Appl. No. 09/870,613.

* cited by examiner

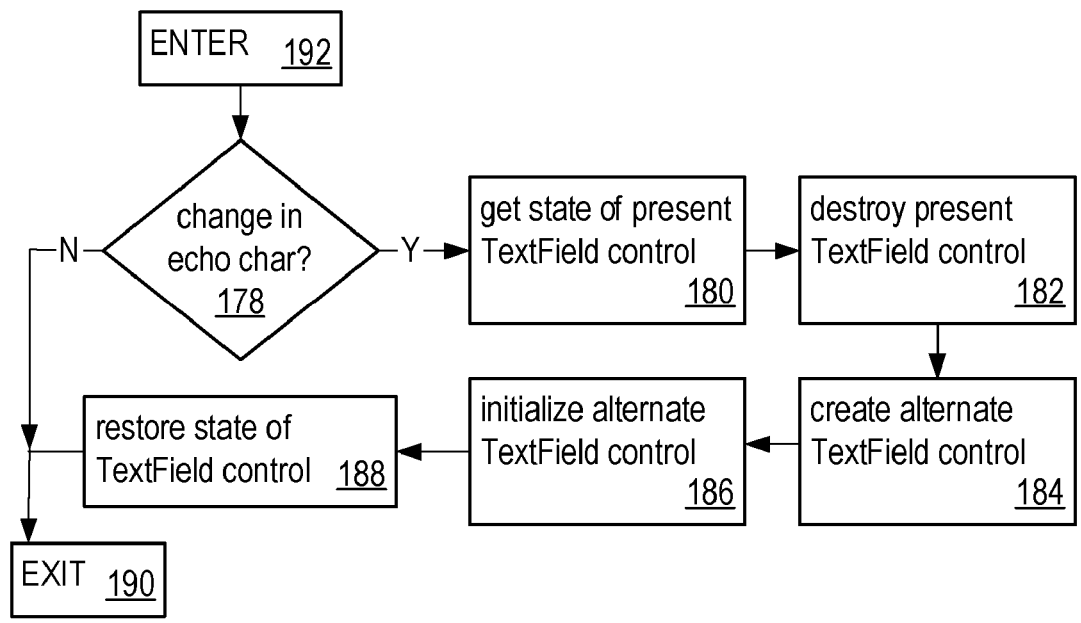
FIG. 18
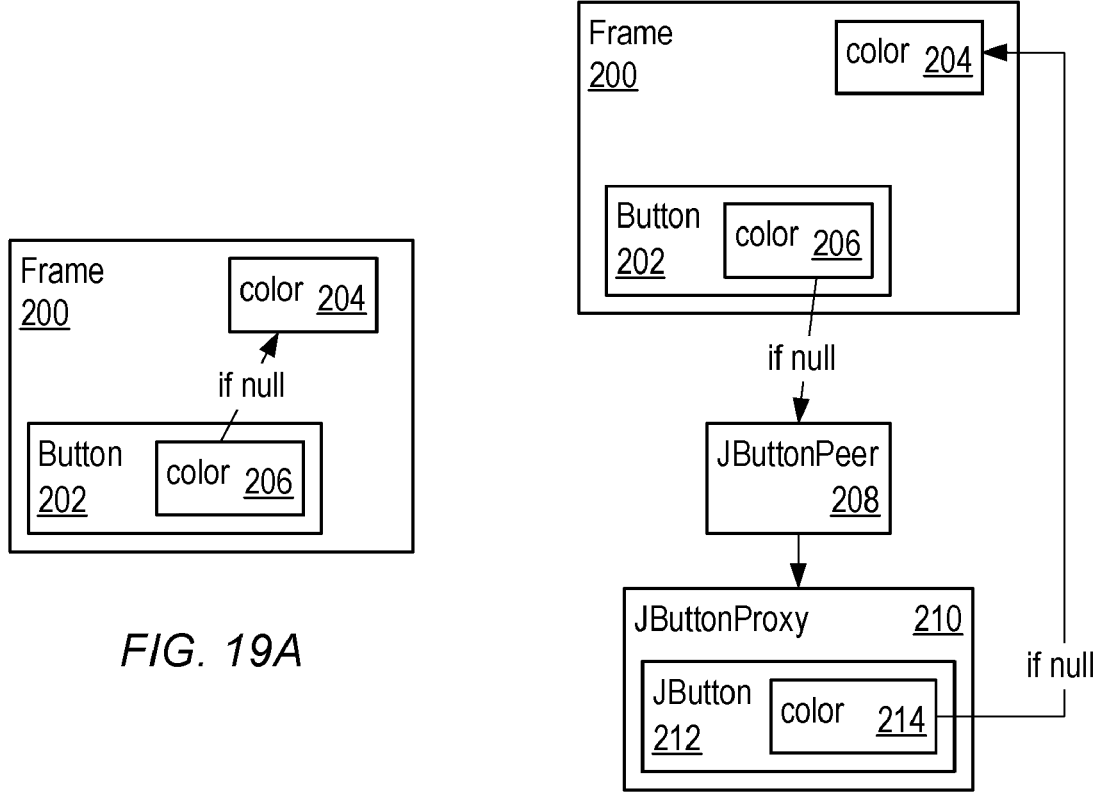
FIG. 19A
FIG. 19B

SYSTEM, COMPUTER-READABLE STORAGE DEVICE, AND METHOD FOR COMBINING THE FUNCTIONALITY OF MULTIPLE TEXT CONTROLS IN A GRAPHICAL USER INTERFACE

RELATED APPLICATIONS

This application is related to the following co-pending U.S. Patent Applications, filed on even date herewith: "System and Method for Encapsulating Software Components in an Application Program Interface Using a Proxy Object," "System and Method for Reducing Memory Use Associated with the Graphical Representation of a List Control," "System and Method for Fast Drawing of Text Fields and Labels in a Java Swing Application Program Interface," "Inheritance of Background Color in a Containment Hierarchy of Objects in a Graphical User Interface," "Dynamic Buffering of Graphic Images by a Platform Independent Application Program Interface," "System and Method for Implementing a Graphical User Interface Across Dissimilar Platforms Yet Retaining Similar Look and Feel," "System and Method for Introducing Enhanced Features into a Java Swing Application Program Interface," and "Application Program Interface that can Maintain Similar Look and Feel of a Displayed Image Regardless of Whether the Interface is Platform Dependent or Platform Independent," all by Scott J. Broussard.

BACKGROUND OF THE INVENTION

1. Field of the Invention

This invention relates to computer software, and more particularly to software for a graphical user interface that is portable across multiple diverse operating systems. This software may be useful for emulating text controls within a platform dependent application program interface by dynamically alternating between two components within a platform independent application program interface. This maintains a consistent interface to legacy Java applications, so that these applications may be ported without modification to heterogeneous computer systems, while providing a consistent look and feel.

2. Description of the Related Art

The continuing proliferation of faster and more powerful computers has been accompanied by an increase in the use of graphical user interfaces. A graphical user interface (or, GUI) offers many advantages over traditional text-based interfaces. A graphical interface may allow multiple application programs to present output simultaneously, each in a distinct window. Thus, it is not necessary to halt one application in order to interact with another. Instead of entering text-based commands and parameters, the user selects icons with a pointing device, such as a mouse. This is faster, easier and less error prone than making these selections using the keyboard.

GUIs are based on the development of object-oriented programming language. Object-oriented programming languages are based on lines of code or "objects" that, when executed, produce an image upon a computer display. Modem object-oriented programming languages can often be written and developed in a relatively short period of time. For example, an application written in programming language A may run 30% faster on a given computer than the same application written in programming language B. On first impression, it would seem that language A is superior to B. However, the programmers using language A may need two months to complete the application, while language B can be finished in a week. In many cases, the additional speed gained by using language A is unimportant. For example, if the application spent most of its time waiting on user input, the 30% speed improvement would not be noticeable. On the other hand, the length of time required to write the program is almost always important, since it reflects development cost. This has led to introduction of modern object-oriented programming languages, such as C++ and Java. Often accompanying the new languages are rapid application development (or, RAD) environments, which typically combine compilers, editors, code debuggers, and other features in a programmer's "toolkit" to accelerate application development.

Object-oriented programming languages represent a new paradigm for software design. Computer programs have traditionally been structured as a sequence of operations, which implements an algorithm or procedure. However, the traditional procedural model suffers from several weaknesses that limit its usefulness for modem software design. In the early days of computers, software programs were of limited size and complexity. Since these programs were typically written by a small group of programmers (often, one individual), it was comparatively easy to ensure that consistent software standards were observed, and issues such as portability and reuse of code were given little consideration. Today's software programs are often huge composites of complex, interacting code developed by disparate teams of programmers. Modem software development requires coordinating the efforts of many individuals to develop a unified, consistent body of software. In these larger, more complex software projects the shortcomings of procedural programming languages become apparent. One area of difficulty that emerges is in maintaining consistent interfaces between the components of a large software program. Software routines interact with each other or exchange data via an interface—i.e., a set of statements, functions, options, etc. for expressing program instructions and data provided by one program segment for use by a another program segment. For example, a printer driver may be called by various other routines in a program to produce hardcopy output.

As noted herein, a software component is any sequence of executable code. The code can be executed from an operating system which configures the computer or microprocessor. When dealing with GUIs, software component can be a sequence of code lines that define an image presented on a computer display. Thus, a sequence of code, deemed a software component, can contain instructions for generating an image. Such a software component can be alternatively known as an "object." For example, the GUI software component is alternatively known as an object, and the object can provide an image upon the display when executed by a processor. In order to operate effectively, it is important that the interface between software components be fully defined and be adhered to scrupulously. For highly complex and extensive programs, this can entail a great deal of effort and can have considerable impact on software development time.

Code reusability is another important factor in modern software development. Time-to-market considerations dictate that reuse of existing code is preferable to writing new code. For example, a programmer developing software to perform spectral analysis may require a program to compute the Fourier transform. It may take him two weeks to write and debug such a program, but just two days to modify a pre-existing program for his needs. Since it is generally more efficient to reuse code than to recreate it, there has been an increasing emphasis on modularity in software design. Modular code is self-contained and has well defined input and output parameters, allowing it to be easily combined with or integrated into other code.

The object-oriented paradigm has arisen to enable faster development of complex software programs. It encourages the use of consistent interfaces between program modules, and is conducive to the creation of reusable, modular code. These features are highly advantageous in the development of large, intricate software programs, requiring the coordinated effort of several programmers.

A departure from traditional programming languages, the object-oriented paradigm is based on objects, rather than procedures. The fundamental entities in an object-oriented programming ("OOP") language are classes created by the programmer, which possess properties appropriate for their intended purpose. Once a class has been defined, one or more objects can be created as instances of the class. Individual objects possess all the attributes of the class they represent. For example, a software component (e.g., a program for a GUI) might contain objects such as windows, menus, buttons, etc. having properties such as color, size, location on screen, etc. In addition to their properties, objects also have methods. Methods are actions supported by the object, by means of which they interact with other objects or respond to external events. A major difference between OOP languages and traditional procedural program languages is that the methods and properties of an object are encapsulated. In object-oriented programming, encapsulation refers to the inclusion within an object of all the resources needed for the object to function—basically, the method and the properties. Other objects adhere to these interfaces to use the object without having to be concerned with how the object accomplishes it. This makes it easier to ensure that objects interface with one another in a consistent manner, and also protects the internal data of the object from unintentional corruption by other program components. By virtue of encapsulation, an object can be thought of as a self-contained atom. When an object is created, certain of its properties and methods are defined as "public," and the remaining ones as "private." Only the public properties and methods are accessible to other objects; the private properties and methods are protected. For example, the properties and methods of a sequence of code (i.e., an object) of a GUI software component which defines the color of a window and the menu layout can be accessible by another object which defines another window, menu, and scroll bar layout so that the first object can be dependent on the second object for producing a sequence of windows, each having its own property and method dependent on each other.

Encapsulation also benefits code reuse by simplifying the manner in which an object is accessed. For example, a programmer can reuse a previously created object having a method that performs a Fourier transform. In an object-oriented scenario, he simply includes the object definition in his program, and references its method when needed. It is generally not necessary to closely examine or modify the code within the object, since the object method completely defines the interface. A feature of object-oriented programming languages that further benefits code reusability is inheritance. The concept of inheritance is that certain software components, or objects, can inherit the properties and methods of a parent software component, or object. Thus, objects of code can be developed as modular building-blocks, with subsequent objects being children of parent objects. For example, a parent object when executed by a processor may produce an image indicative of an entire window and when executing a child object, the child object produces a sub-window, or template, within the parent object-executed window, or image. Importantly, the parent object can define a class, and the child object can inherit the class (properties and methods) of the parent object. In addition, the child object can also take on further methods and properties unique to the child object class. For example, a "jet" class can be defined as a child of an existing "airplane" class, with added properties, such as "turbine velocity." Once the subclass exists, the programmer is free to create new objects with jet-like properties.

Some objects have a graphical representation. For example, it is common to include buttons, checkboxes, and other similar "controls" in a GUI belonging to an application program. Images associated with these objects are displayed on a computer screen to allow the user to interact with the application. Among the methods of such objects are display methods (e.g., "paintIcon"), which can be invoked to make the object appear on the computer screen. When a displayable object (i.e., object being a sequence of code) is created by an application program, its size and location with respect to a "layout" must typically be declared. A layout is a region of the screen allocated for the display of a given set of controls, and within which the arrangement and orientation of the controls are established. To permit a user to interact with the GUI, displayable controls typically include methods enabling them to respond to external events, such as mouse button clicks. The object code that is the recipient of a user event (e.g., a pointer device placed over a button displayed on a computer display) is referred to as the target object. Thus, a target object can receive method-type code imparted to it when a user interacts with the GUI.

Java is a modern OOP language, designed with an emphasis on portability. As used herein, the term "platform" refers to a specific combination of hardware and operating system. More specifically, a platform consists of an operating system, the computer system's coordinating program, which in turn is built on the instruction set for a processor or microprocessor, the hardware that performs logic operations and manages data movement in the computer. A software program is said to be "portable" across various platforms if the program can run without modification on any of those platforms. This "write once—run anywhere" principle is the underlying philosophy behind OOP languages such as Java.

The portability of Java depends on the presence of a Java virtual machine (JVM) in the target computer (i.e., the computer on which the Java application is to execute). A JVM "translates" the generic Java code into instructions specific to the target machine (i.e., "native" code) at runtime. Therefore, the same Java program can run without modification on any computer for which a JVM exists.

Since its introduction, Java has found use in many areas, including GUI development, where the portability of Java code is highly advantageous. As used herein, the "look and feel" of a GUI refers to such things as the appearance, color and behavior of Buttons, TextFields, Listboxes, menus, etc. and their mouse, keyboard handling and behavior. Look and feel is the generic way in which to describe the appearance of an image on a computer display to that of another image on a computer display. If the window, icons contained within the window, the control menu, the general layout of that window, and the colors of the various features shown on that window are similar to that of another window image, then the two images are said to have essentially the same look and feel.

Often, a software program is intended to run on various machines, or under various operating systems, while maintaining a consistent look and feel. If the GUI is written in Java, a great deal of the code can be common across platforms, since Java is portable. This shortens development time, since the developer only has to write one version of the GUI code to be ported to all of the desired target machines or operating systems. It also improves maintainability of the code. When bug fixes or feature upgrades are necessary, they are confined to one version of the code, rather than several machine/system-specific versions.

Unfortunately, the portability of Java does not guarantee a completely consistent, platform-independent look and feel for a Java-based GUI. This is because the GUI still derives some of the look and feel of the platform through its reliance on an application program interface ("API"). An API is an interface used by an application program to access operating system services. Therefore, API is an interface between the application program and the operating system, or platform. The UIManager is a constituent of the API that contains the look and feel settings of the GUI. By making calls to the API, an application program can invoke the resources of the operating system, for example, to write to the computer screen or detect the position of the mouse cursor, or to request the current look and feel settings. Traditionally, Java applications utilize an API known as the abstract windowing toolkit ("AWT"). Using the AWT, multiple platform-specific implementations of each GUI component, known as component Peers, can be created. Component Peers or software component Peers are object lines of code that contain one or more such lines unique to the operating system in which the component software Peer is intended to interface. When executed, the component Peer will produce an image dependent on the operating system since the program interface of an AWT is platform dependent. Due to the platform-dependence of the interface toolkit or AWT, different operating systems will have different AWT implementations. As a result of these dissimilarities, the appearance of controls (i.e., buttons, lists, checkboxes, etc.), created by a Java-based GUI will vary when the GUI is ported to different platforms.

The platform-dependence of the AWT also increases the difficulty of enhancing and maintaining Java GUI application code. In order to add a new feature to the GUI, for example, it is necessary to modify dissimilar code in the AWT for each supported platform. Moreover, it may be extremely difficult to obtain consistent behavior from the added feature, because of code differences in the platform-specific AWTs.

Text rendering is another consideration in the development of a platform-neutral GUI. Various platforms employ diverse methods of drawing text, some of which are more efficient or yield better quality than others. The native methods used in many AWTs can use only one font at a time, and do not support font searching to locate the glyphs (graphic symbols that provide the appearance or form for a character) required for accurate text rendering. Because of this, the consistency of the look and feel may be lost when the GUI is ported from a system with good text quality to one with poor text quality.

Furthermore, many operating systems do not use unicode representations for text, making them susceptible to conversion errors or limited character set coverage. Unicode is a new standard for associating binary codes with text or script characters. Officially called the unicode Worldwide Character Standard, it is a system for the interchange, processing, and display of written text in all the major languages of the modern world. Currently, the unicode standard contains 34,168 distinct coded characters derived from 24 supported language scripts, covering the principal written languages of the world. Unicode support is important for a universal, platform-independent GUI. However, dependence on the platform-specific AWT presents an obstacle to the use of unicode in a Java-based GUI.

SUMMARY OF THE INVENTION

The problems outlined above are in large part solved by a system, method, and computer-readable media for producing a platform-independent application GUI program interface, API. The API receives an application program and produces a software component (object). The object is GUI code that, when executed by a processor, produces an image on a computer display. The improved API can either have its own native code or, in contrast, can derive its code from an ancestor software component. Thus, in the latter example, the API has no native code, but borrows or "inherits" its code from another software component.

If the API has its own native code, the API is said to be a heavyweight software component. The AWT uses a software component called a Peer, which is necessary in order to interface with the particular operating system, or platform, in which it is coupled.

In instances where the API is a lightweight software component, the API inherits its code from other components. There may be multiple software components from which the API inherits its properties and methods. Those ancestor components are often referred to as "Swing" API software components and available to be borrowed from.

By using the resources of Swing software components in lieu of corresponding AWT components, a more portable, platform-neutral API can be created. The API can, therefore, ideally produce a software component (object) as platform independent, and which generates an image which has the same look and feel independent of the operating system used. Legacy applications using the AWT can be updated to use equivalent Swing component Peers. However, several complications prevent Swing from being able to completely or directly replace the AWT.

Swing components cannot directly replace AWT Peers, since the AWT controls created by a legacy application are already present in a layout, and AWT controls a generally cannot act as containers for other controls. Swing software components cannot replace the heavyweight AWT Peers because the Swing components are designed for a different role or purpose within the system, which typically cannot be modified. In other words, there are limitations inherent in the design of the Java JVM that are unalterable, and therefore this invention must work within those constraints.

For example, the architecture of the JTextField and JPasswordField components in Swing is different from that of the TextField AWT component. Unless modified, these Swing components may not function properly when used by the legacy application. Moreover, Swing TextField and Label component Peers often exhibit poorer performance than their AWT counterparts.

In view of these, and other considerations, it would be desirable to have some means of replacing the heavyweight AWT Peer classes with lightweight Peers (such as those in Swing), while avoiding the problems and limitations described above.

An API having both Swing-type features and AWT-type features is referred to herein as "AWTSwing," and can be used to provide improved functionality and a more consistent look and feel for Java application programs. AWTSwing replaces the heavyweight Peer classes in the AWT with lightweight Peer classes while preserving the same interface. This allows legacy applications, which previously relied upon the graphics resources of the AWT, to run without modification. AWTSwing also augments the functionality of Swing, so that new applications can deploy a modem full-featured graphical interface. Because AWTSwing uses no native code for the windowing controls, it is truly portable. Therefore, the GUI for a Java application based on AWTSwing will have a consistent look and feel regardless of which operating system it is ported.

BRIEF DESCRIPTION OF THE DRAWINGS

Other objects and advantages of the invention will become apparent upon reading the following detailed description and upon reference to the accompanying drawings in which:

FIG. 18 shows a flowchart representation of the logic for alternating the two Swing controls; and FIG. 19 represents a scheme for background color inheritance employed by AWTSwing.

Figure 1:
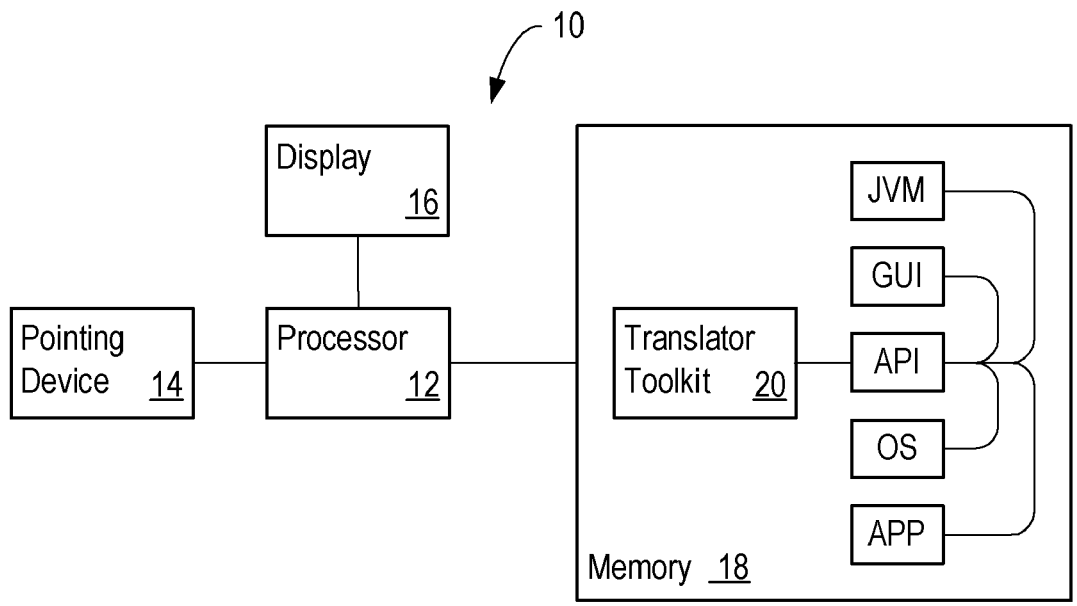
FIG. 1 illustrates a computer system capable of supporting a graphical use interface with a consistent look and feel across diverse operating systems.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The need for rapid development of software programs has led to the introduction of modern object-oriented programming languages, such as C++. Among current OOP languages, Java is regarded as a "write once—run anywhere" language. This is because, unlike programs written in traditional languages, Java programs can be run without modification on various different computers or under different operating systems. However, a Java application may not be completely portable in terms of the look and feel of its graphical interface. This can occur if the application makes use of the windowing resources of the platform-specific AWT. The numerous operating system-specific versions of the AWT are mutually inconsistent in regard to the graphic features supported and the manner in which those features are implemented.

FIG. 1 illustrates a computer 10. Computer 10 includes a microprocessor 12 which operates from any given instruction set, such as a reduced instruction set or X86 instruction set. Coupled to processor 12 is a pointing device 14, such as a mouse or keyboard arrow indicator. A computer display 16 is also provided for displaying images produced by the processor, when executing an application program. A memory 18 can be coupled to processor 12. Contained within memory 18 may be a Java virtual machine (JVM), a graphical user interface (GUI), an application programming interface (API), operating system (OS) program, and an application program (AP).

The Java JVM contains a toolkit, which is a translator. The toolkit can be written in Java for execution by the JVM via the API. Translator toolkit 20 is portable across multiple OS platforms, and, translates or adapts standard platform-independent java code to native java code. The toolkit defines the platform specific implementation objects that comprise the GUI for use by a software application.

Translator toolkit 20, therefore, takes the application program presented to the API and translates GUI information to a form usable by the operating system. Accordingly, the translator toolkit 20 enables a software application that appears the same on all platforms. The JVM can then translate calls from the application into the appropriate system calls applicable to each host operating system. Importantly, the Java code can be executed by the processor independent of the operating system.

Figure 2:
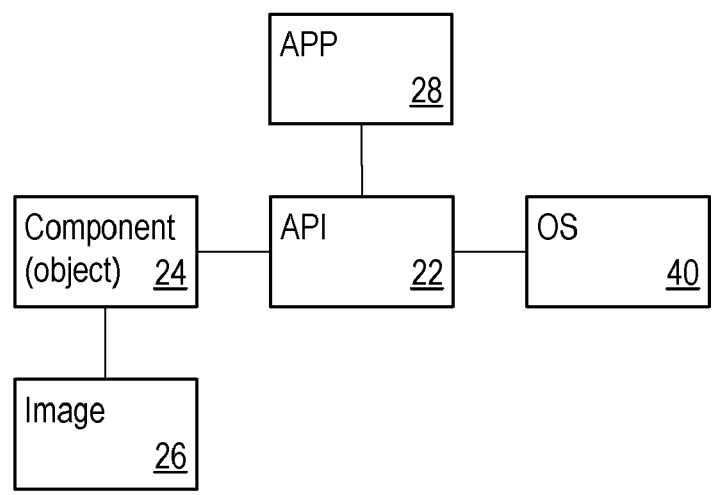
FIG. 2 illustrates in more detail the interface between an operating system (OS) and an application program.

FIG. 2 illustrates in more detail the interface between an operating system (OS) 40 and an application program (AP) 28. The interface, known as an application program interface 22 or API, allows an application program 28 to communicate with the operating system 40 and, thus, enables use of the operating system's functions. As will be discussed, API 22 can either be an AWT-API or a Swing-API. If API 22 is an AWT-API, then it contains a Peer class of software components that bridges the platform-independent software component 24 with the underlying native graphic subsystems that are dependent on the OS 40. These graphic systems are utilized to create a visual representation, sometimes called an image, associated with the platform-independent software component 24. The Peer classes within an AWT-type API 22 contain mostly native methods of what will be later known as, for example, a ButtonPeer.

If API 22 is a Swing-API, then the platform-independent component 24 or Button is translated from another platform-independent implementation within API 22, such implementation being a Swing-application, implemented as, for example, a JButtonPeer, inheriting from JComponentPeer.

Regardless of whether the API is an AWT-type or a Swing-type, a platform-independent implementation of an object is produced and, when executing that object, the object generates a visual representation 26 on the display, shown in FIG. 1.

Figure 3:
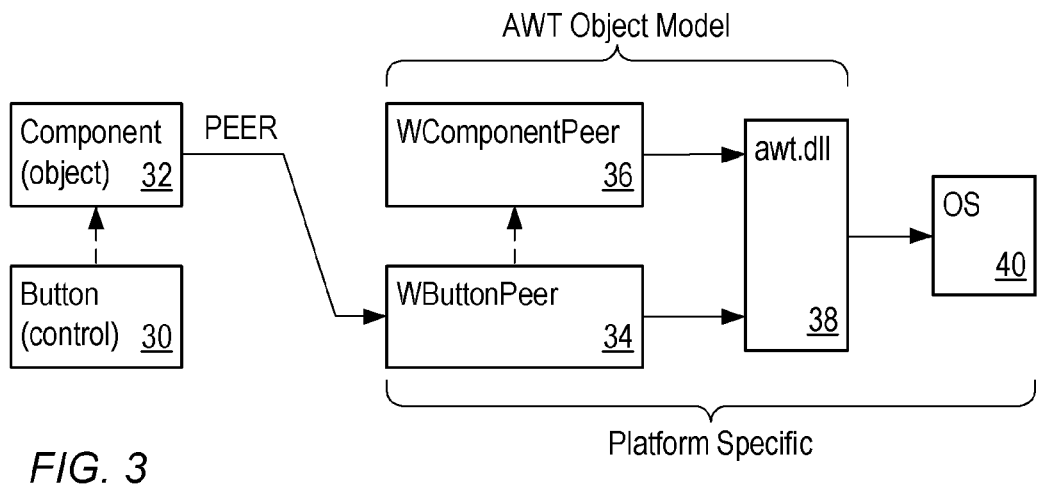
FIG. 3 illustrates how controls in a user interface are graphically represented with the AWT.

FIG. 3 illustrates the relationship between a graphical control (a Button) used in a Java application and its hardware-dependent implementation via the AWT. Therefore, Button 30 is a subset of the object code 32 used to generate a visual representation upon the display. Button 30 is, however, code used to implement a control in a GUI environment. Such controls are describable in terms of their graphical attributes (i.e., their size and location on the display) and their characteristic behavior. For example, the graphical representation of a Button is typically a rectangular region of the display, and its behavior may comprise responding to a mouse click by changing its state from "off" to "on", or vice-versa. Button 30 can represent an action word on the display such that, when targeted by the pointer, the application program can be invoked. The dashed lines in FIG. 3 indicate inheritance. For example, the Button 30 is a type of Component 32. This relationship is often described by referring to the Button as an "instance" of the "parent" Component class. Actually, since every object in Java is an instance of a class, it is more correct to say that the Button class is descended from the Component class. The characteristics and capabilities of the Button and Component are common across all platforms. However, the implementation of the Button and Component will depend on the particular machine or operating system. For example, in the application, the programmer may have set the Background color of the Button to "gray." If not, the actual appearance of the Button may still depend on the operating system, however. When the application is run under the Windows operating system, the Button may be a light, flat gray, while on a computer running Unix®, "gray" may be rendered as a bluish, metallic gray. In each case, the graphics object may be displayed slightly differently, due to the fact that some of the visual attributes of the object are inherited from the operating system. In this example, the Button does not have a graphical representation of its own, and uses the graphical representation of the heavyweight Peer (i.e., the native Windows or Unix graphical representation of a Button).

Thus, the platform independent relationship between the Button 30 and the Component 32 is mirrored in the platform-dependent AWT by the inheritance relationship between the WButtonPeer 34 and the WComponentPeer 36. As stated earlier, the heavyweight Peers associate each of the controls in the GUI of the application program (such as Button 30) with corresponding native graphics objects in the windowing system of the OS. These heavyweight Peers are defined in the dynamic linked library (dll) file, AWT.dll 38, which is specific to the operating system 40 (e.g., Windows). As stated above, since the AWT.dll file 38 is different for each platform, the rendering of the Button 30 may vary from one operating system to another. Note that the application programmer has virtually no control over this variability.

A further consequence of reliance on the platform-dependent AWT is that a great deal of effort may be required to change or enhance features in the graphical interface of a Java application, in order to ensure that the change or enhancement is supported in every associated AWT. Since the implementation of the heavyweight Peers for Java graphics components is not consistent, one operating system may require little effort to modify, while another may be quite cumbersome.

The Swing API is an alternative to the AWT, which alleviates some of the look and feel inconsistencies that arise when porting GUI-containing Java applications to diverse operating systems. Swing is part of the Java Foundation Classes (JFC), a set of five APIs designed to assist programmers in developing rich-featured applications. JFC contains the AWT, Java 2D, Accessibility, Drag and Drop and Swing. Swing does not completely replace AWT, but extends it through the addition of a new set of components. A subset of these components is analogous to the basic AWT components. However, the Swing components are lightweight, as opposed to the heavyweight components of the AWT. As mentioned previously, lightweight components don't use platform-specific implementations, but are instead written entirely in Java.

Figure 4:
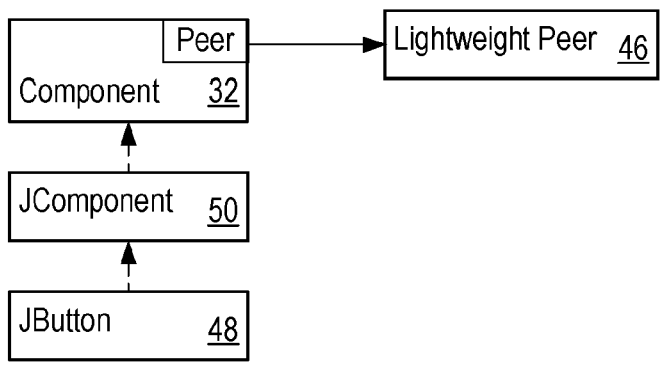
FIG. 4 illustrates how controls in a user interface are graphically represented with Swing.

The relationship between a target control created by an application and the Swing components that render the graphical representation associated with that control is represented in FIG. 4. The target component in this example is a Swing control, JButton 48, which is derived from the Swing JComponent class 50. JComponent 50 is, in turn, a subclass of the AWT Component class 32. Because the Swing classes JButton 48 and JComponent 50 are derived from Component class 32, they inherit a Peer relationship similar to that of the heavyweight AWT controls (as represented in FIG. 3). However, in contrast to the hardware-dependent implementation of FIG. 3, the Peer 46 is lightweight, and does not reference a native graphics object from the operating system. Instead, a graphical representation of the JButton 48 is displayed in a platform-independent manner by the JVM.

Figure 5:
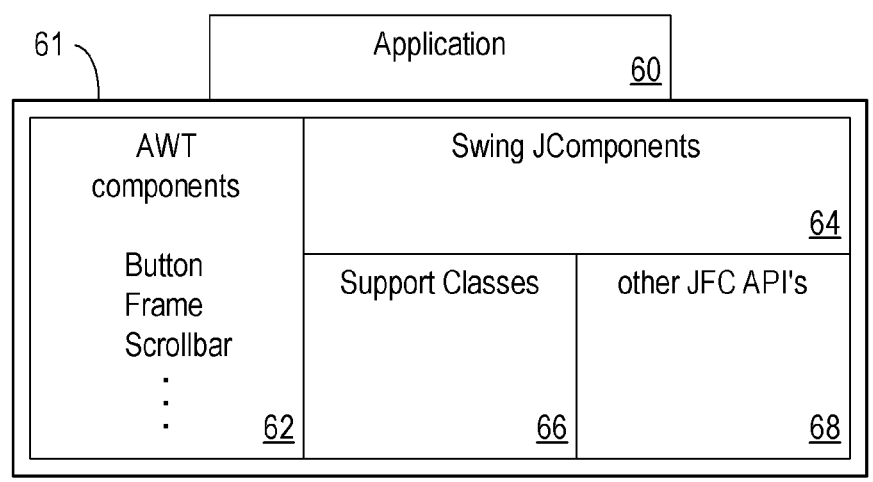
FIG. 5 shows the relationship between the elements of the Java Foundation Classes.

FIG. 5 illustrates the relationship between Swing, AWT and the other JFC components. The arrangement of the components in FIG. 5 is intended to represent their hierarchical status and their membership within the JVM class libraries 61. The application program 60 is at the top of the hierarchy, since it has access to all of the JFC resources. The legacy AWT 62 and the Swing API 64 are at the next level, since they are directly invoked by the application to create and manipulate the graphical content in its user interface. Note that the AWT 62 is not subsumed within Swing 64, since there are some operating system dependent features within the AWT that are not implemented in Swing. In addition to its GUI-related classes, Swing also relies on a collection of support classes 66. The other API's 68 in JFC are also shown at this level.

Unfortunately, Swing cannot be directly employed to eliminate the platform-dependency of the user interface in legacy applications that use the AWT. One reason for this is that straightforward replacement of AWT Peers with Swing components is not possible. In Java, graphics objects, such as buttons, labels, sliders, etc. require a "container." A container (also referred to as a "collection") is a component that can group together other components and containers. A container forms the root component in a hierarchy of components consisting of the container and the components within it. The top-level container in a graphical display is the Frame. Consistent with this hierarchical relationship, the components within the container are termed "children" of the "parent" container. Thus, graphics objects created by a legacy application program are children of the Frame in which they appear. The arrangement of components within the Frame is referred to as the "layout," and a Frame typically has a layout manager that controls the visual placement of components in the Frame.

Figure 6A:
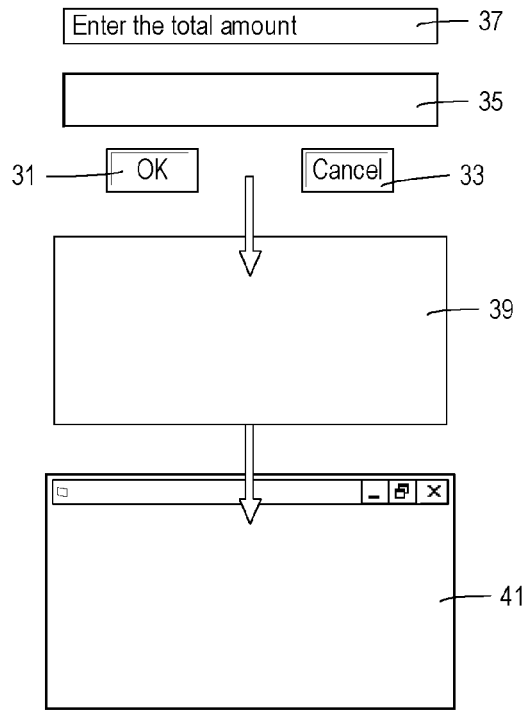
FIGS. 6a and 6b illustrate the z-order of graphical controls within a container.
Figure 6B:
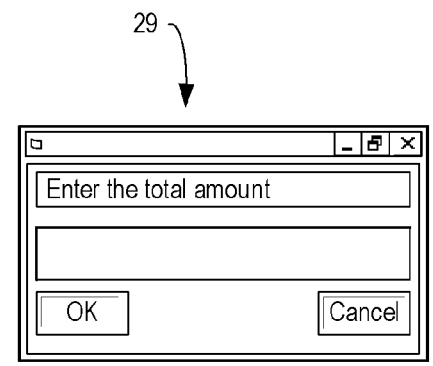

The arrangement of components in a container is comparable to a stacking of layers, as illustrated in FIG. 6a. Starting with Frame 41 as the bottommost layer, controls are added in progressive layers, overlaying the ones beneath them. If the horizontal and vertical size and location of the graphical controls are analogous to their X and Y coordinates in a two-dimensional coordinate system, the counterpart of this stacking order is the depth, or z-axis. Hence, it is often referred to as the "z-order." When one control overlays another, the underlying control is acting as its container. In FIG. 6a, the bottom layer is the Frame. A panel 39 is then added, by placing it on top of Frame 41. Panel 39 is then overlaid by a label 37, textfield 35 and two Buttons 31 and 33, noted in the examples as "OK" and "Cancel." Thus, the panel contains the Label, TextField and both Buttons, and is contained by the Frame. A composite view 29 of the Frame, with all its children, is shown in FIG. 6b. Note that not all types of controls can serve as containers. For instance, Java does not permit stacking other objects on top of the two Buttons shown.

In the case of a legacy application program, the graphics objects are associated with component Peers in the AWT, which invoke the graphical resources of the operating system to render the screen representation associated with each object. It would be desirable to replace the platform-specific AWT renderings of these objects with screen representations derived from Swing, without modifying the legacy application program. A simple way to accomplish this would seem to be to merely substitute an equivalent Swing control for the original heavyweight control. However, in order for this to work, the reference to the original component in the application program would have to be altered to refer to the replacement Swing control. This entails modifying the legacy software and the rather extensive awt.dll file each time a new control must be evoked, and is therefore an undesirable option.

Another apparent solution would be to add the necessary Swing components to the existing layout, allowing them to paint over the platform-specific AWT renderings of the objects in the layout. This creates difficulties for the layout manager of the Frame in which the controls are contained, since it results in multiple graphics objects occupying the same region of the Frame. Moreover, the Swing components would not "compete" successfully with the pre-existing heavyweight components, since heavyweight components typically obscure any overlapping lightweight components. For example, if a lightweight Button were painted over a heavyweight Button, the heavyweight Button would still be visible.

Another approach would be to adapt the use of the Peer mechanism, creating lightweight Peers that, instead of invoking the graphics resources of the operating system, instead utilize the lightweight Swing objects. However, this tactic fails due to the fact that these Swing components were not declared to be contained in the Frame by the legacy application. Since they are not children of the Frame, they cannot respond to events, such as mouse clicks, directed to the corresponding region of the screen.

Figure 7:
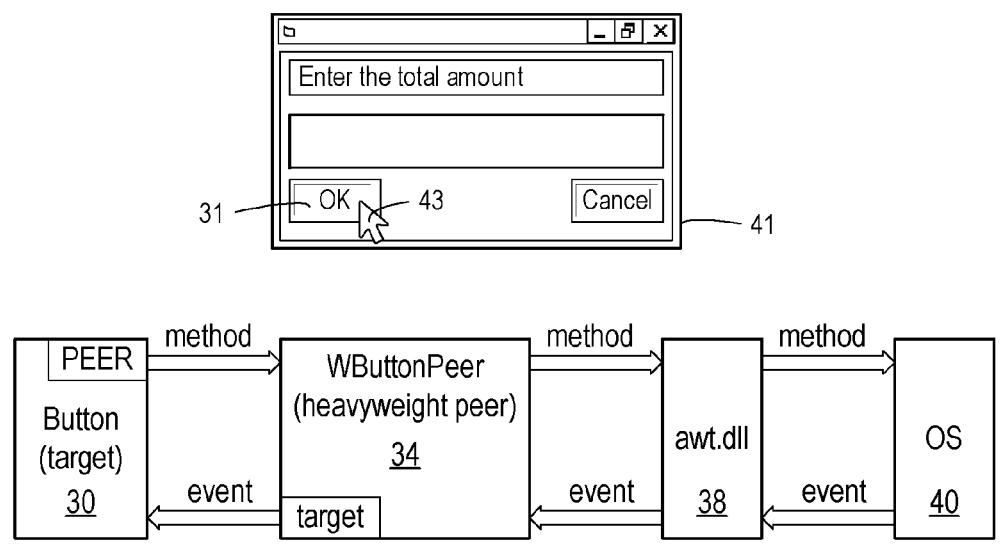
FIG. 7 illustrates the flow of event notifications and method calls in an AWT-based application program.

FIG. 7 represents the flow of events and method calls in a legacy AWT-based application. A Frame 41 is shown at the top of FIG. 7, along with a complement of controls, including a Button 31. Also shown is a mouse cursor 43, positioned over Button 31. In a legacy AWT-based application, Frame 41 and all of its children are native objects of the operating system. For example, if the application were running under the Windows operating system, the Button would inherit its appearance (i.e., its shape, color, etc.) from Windows' own look and feel. The user may click the mouse while the cursor is positioned as shown to "push" Button 31, to interact with the application program via the graphical user interface. For example, the application program may be designed to respond to the "OK" Button being pressed by performing some calculation, displaying some result, etc. The lower half of FIG. 7 shows a functional block diagram representing the flow of events and method calls that ensue in an AWT-based GUI when the user presses the "OK" Button. The double arrows going from left to right represent the propagation of method calls, made to the native graphical objects in the windowing system of the operating system. The double arrows going from right to left represent the propagation of event notification. A method call is a call or get routine to a file to invoke a graphical display, whereas an event is a prompt to a user to interface with a displayed image, i.e., a user clicking or pushing a mouse button.

When the user clicks the mouse while the cursor is positioned over the screen image of the Button 31, that event is detected by the operating system 40. The event notification is relayed to the awt.dll file 38, which determines from the location of the mouse cursor that the region of the screen devoted to Button 31 was selected when the event occurred. On the basis of this information, the layout manager of the Frame allows the event notification to be routed to the WButtonPeer 34, which has a pointer back to the platform independent Button 30 (the ultimate target of the mouse-click event) created by the application program, causing it to change state. The application will typically contain code (an event handler), allowing it to respond to this change in state.

The application may call methods of the Button 30, for example, to cause it to perform some action, such as to resize or move itself. Such a method call is directed to the appropriate Peer object—in this case, the heavyweight WButtonPeer 34. The Peer correlates this platform-independent call with the necessary operating system-specific code in the awt.dll 38 to implement the desired action. The operating system 40 then performs the requested action using its native graphics objects and procedures.

As stated above, it would be desirable to eliminate the operating system dependency of existing legacy Java applications by replacing the heavyweight implementation of the graphical objects with a lightweight, platform-independent implementation. The Swing API would appear to be capable of serving this purpose. However, as pointed out in the preceding discussion, it is not possible to merely substitute Swing for the heavyweight AWT API.

A system and method is disclosed that overcomes the various difficulties connected with migrating legacy applications from the AWT to Swing. The system and method are embodied in a functional extension of Swing, referred to herein as AWTSwing. AWTSwing makes the platform-independent features of Swing available to AWT-based Java applications. Furthermore, legacy AWT-based applications need not be modified to use AWTSwing. AWTSwing may therefore be considered a platform-independent version of the AWT.

The means by which AWTSwing succeeds in substituting Swing components for those derived from the AWT is a further aspect of the present system and method. A proxy object is created that indicates to the Swing component that it is part of the same layout as the AWT-based control. The following explanation of the manner in which this is accomplished is set forth in FIG. 8, illustrating the relationship between a Button object created by an application program and the corresponding elements of the AWTSwing API.

Figure 8:
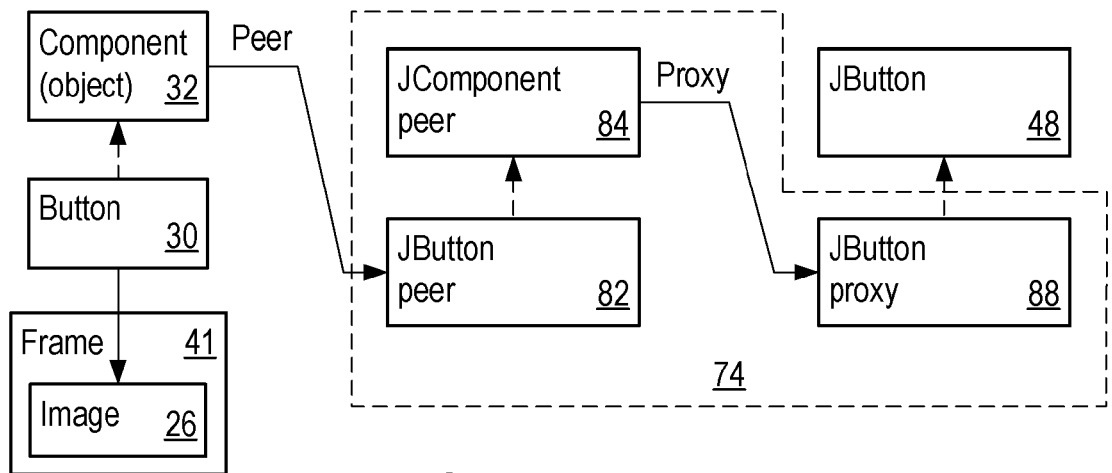
FIG. 8 illustrates how controls in a user interface are graphically represented with a lightweight replacement for the AWT API, embodying the system and method disclosed herein and referred to herein as AWTSwing.

FIG. 8 illustrates a Swing-type API 74 (region enclosed within the dotted lines). In FIG. 8, Button 30 is derived from the Component class 32. Also, the Peer mechanism links the Button object 30 with the graphics resources used to create and manipulate its graphic image 26, which is contained within Frame 41. However, in this case, the JButtonPeer 82 (and the JComponentPeer 84, from which it is derived) are lightweight Peers, written entirely in Java and having no dependence on the windowing resources of the operating system. Instead, the JComponentPeer 84 intercepts key query commands related to the location and event status of the Button object 30 and routes them to a JButtonProxy object 88. In the present embodiment, the following methods of the Swing object are intercepted and redirected by the proxy object:
   isShowing( );
   getLocationOnScreen( );
   getGraphics( );
   proxyRequestFocus( );
   requestFocus( );
   getInputcontext( );
   getLocale( );
   nextFocus( );
   createImage( );
   getParent( );

As a result, the JButtonProxy 88 responds to key events, such as focus, mouse, sizing, etc., directed to the original AWT-based control. JButtonProxy 88 is a subclass of the Swing JComponent class and, indirectly, of the JComponent class, and inherits methods and properties thereof. However, Java allows for customization (commonly referred to as "overriding") of inherited methods. In particular, the getParent( ) method of the JButtonProxy identifies as its parent the Frame 41 of the target Button 30. Thus, the JButton "thinks" it belongs in the target's Frame, while the Frame knows nothing of the existence of the Swing component. Furthermore, when the Button 30 is asked to draw itself, the call to the drawing method of legacy AWT object is redirected by lightweight Peer 84 to JButtonProxy 88, which accesses the drawing methods of the JButton class 48. This invokes the platform-independent methods of Swing to paint the region of the screen originally allocated for the Button 30 in the AWT-based application.

The substitution of lightweight Peers, such as JButtonPeer 82, for the heavyweight Peers in the AWT, is accomplished without modifying the application. A utility within the JVM, known as the toolkit, creates a Peer object whenever it is necessary to display the corresponding target component. The toolkit may be modified so that it substitutes a reference to a lightweight Peer whenever the legacy application calls for the display of a control. Since the lightweight Peers are designed to interface to the application in exactly the same way as the heavyweight Peers, this substitution is completely transparent to the application.

Using the techniques described above, AWTSwing replaces most of the heavyweight Peers with lightweight counterparts. In the present embodiment, the new Peer classes are arranged in the following hierarchy:
   JWindowPeer
   JFileDialogPeer
   JPopupMenuPeer
   JMenuBarPeer
   JMenuItem
      JMenu
      JCheckBoxMenuItem
   JCanvasPeer
      JPanelPeer
      JScrollPanelPeer
      JComponentPeer
         JButtonPeer
            JCheckBoxPeer
            JchoicePeer
            JLabelPeer
            JListPeer
            JTextComponentPeer
               JTextAreaPeer
               JTextFieldPeer
            JScrollBarPeer There is still some native code required in AWTSwing, since the Swing components JFrame, JWindow and JDialog inherit from the windowing system's Frame, Window and Dialog components, respectively. However, none of these components directly influences the look and feel of the user interface.

Figure 9:
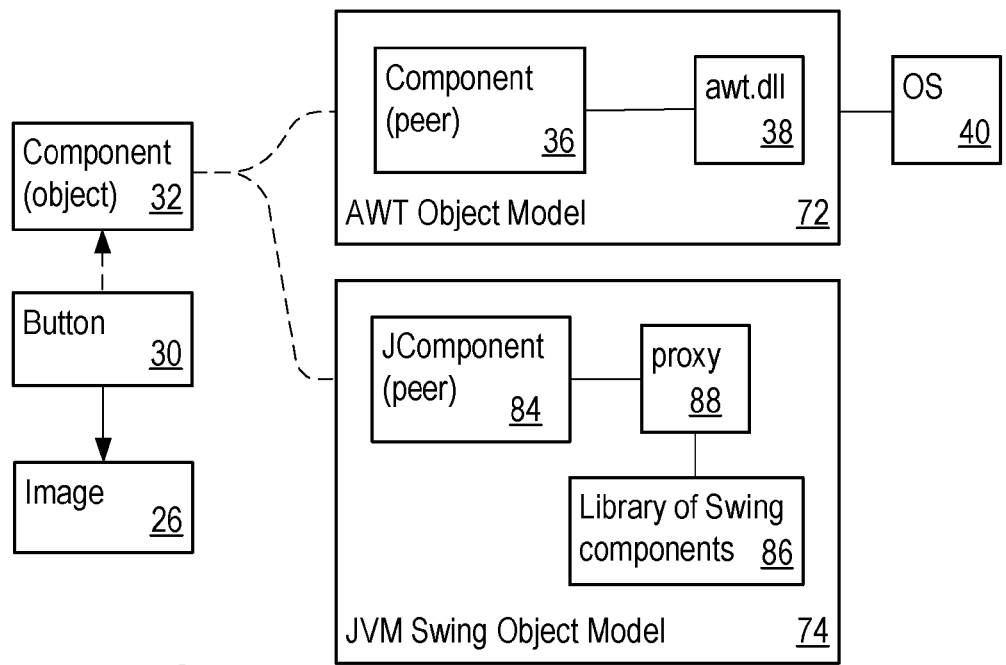
FIG. 9 represents the alternate use of application program interfaces containing heavyweight and lightweight software components.

A comparison between the heavyweight AWT API and the lightweight AWTSwing API is shown in FIG. 9. Button 30 is a graphical control used in a legacy Java application, which employs object code 32 to generate an image 26 as part of a GUI. The user interacts with the Button 30 by pointing at, clicking on, etc. its associated image 26. The object code 32 is platform independent and accesses the platform-specific graphics hardware of the computer through either of the APIs. In the case of the heavyweight API 72 the interface is provided by a heavyweight Peer 36, while in the case of the lightweight API 74 the interface is provided by a lightweight Peer 84. Both Peers are platform independent in their interface to the object code 32, but the heavyweight is platform specific in its interface to the hardware and operating system of the computer, and the lightweight uses other platform independent interfaces (Swing) to perform its function without using the operating system. Therefore, they serve as a software translation layer between the portable Java application and its runtime environment.

In the case of the legacy AWT-type API 72, the Peer 36 makes use of a platform specific library, awt.dll 38, and the native graphics resources of the operating system 40 to render the image 26. The Swing-type API 74, however, uses the Proxy mechanism 88, as disclosed herein, to employ the platform-independent graphics resources of Swing 86 to render the image 26. Since the lightweight Peer 84 interacts with the object code 32 in substantially the same way as the heavyweight Peer 36, the Swing-type API 74 may be substituted for the AWT-type API 72 without having to modify application code or the target component code 32.

By redirecting method calls intended for the original target to the proxy, and modifying the getParent( ) method to return the Frame created for the target, an environment is created in which the proxy functions as if it were part of the layout containing the original heavyweight AWT control. The component is then said to be "encapsulated". Encapsulation of the proxy component enables proper event routing and allows it to functionally replace the corresponding heavyweight control. The flow of event notifications and method calls is explained below with reference to FIG. 10.

Figure 10:
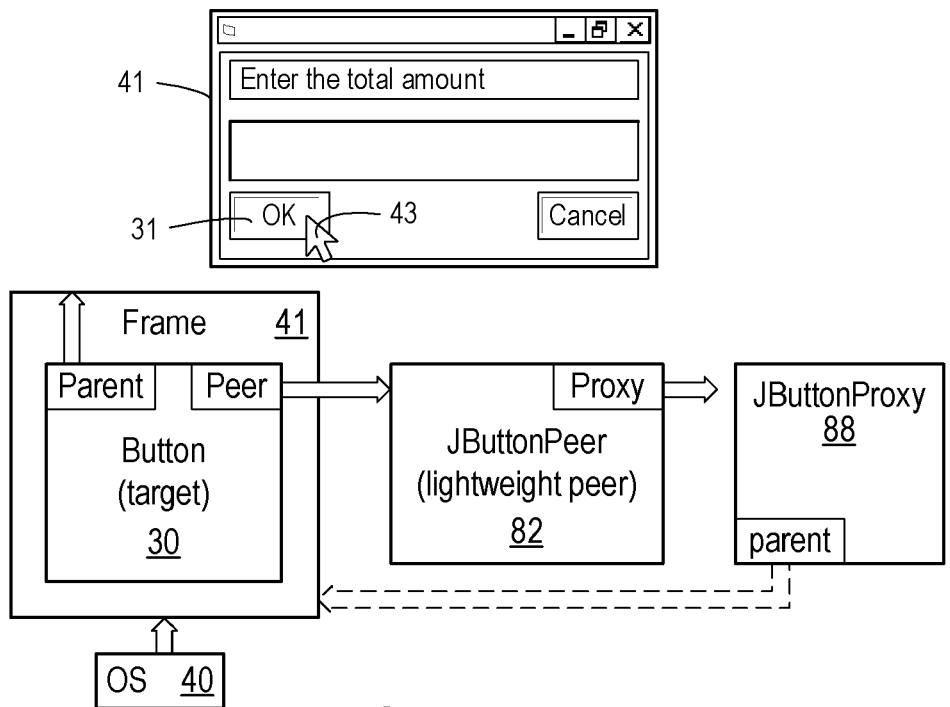
FIG. 10 shows the flow of event notifications and method calls in an AWTSwing-based application program.

FIG. 10 depicts a scenario like that of FIG. 7, in which an event is initiated by a user positioning the mouse cursor over the image of a Button on the screen and clicking the mouse button. In this case, however, we assume that the user interface associated with the Button belongs to a legacy application employing AWTSwing, rather than the AWT. As explained above, Frame 41 is still a heavyweight container. The "OK" Button, however, now has no heavyweight counterpart. As a result, the mouse-click event from the operating system 40 is now directed (as a generic button-click event) to the Frame, rather than to a heavyweight Button control. The layout manager of the Frame behaves as though the Frame still contained a heavyweight Button, however, and has allocated a region of the Frame for its graphical image. Based on the position of the mouse cursor at the time of the mouse-click, the Frame interprets Button 30 as the target of the event. Therefore, the event notification is routed by JButtonPeer 82 (which is indistinguishable to the application from its heavyweight counterpart), then to the JButtonProxy 88. Upon receiving the mouse-click event notification, JButtonProxy 88 changes state (from "off" to "on," or vice-versa). This state change requires that the component redraw itself (since the image of the Button should now appear to be pressed), so a redraw event is propagated back from JButtonProxy 88 to its parent, which the proxy interprets to be Frame 41. As before, the Frame calls a lightweight method of the JButton Swing class to redraw the image of Button 30 to indicate that it has been "pressed" by the user. Proxy 88 therefore serves two purposes: to translate method calls to appropriate Swing components within the Swing library, and to translate event calls to the appropriate Frame target.

A number of significant benefits result directly from the use of AWTSwing, for example, code maintainability is greatly improved, since the same API is used for all the supported operating systems. Consequently, if a problem must be corrected, or a feature added, the necessary changes are confined to a single body of code. This significantly reduces the cost of maintaining and upgrading the code. Consistent, high quality text drawing across all supported platforms is also achieved, due to the replacement of the diverse font rasterizers in the various operating systems by the very capable T2K/Freetype font rasterizer. This is highly advantageous, since the text rendering capabilities of some operating systems are quite poor. For instance, the Unix versions of the choice control, and the TextArea and TextField components are severely limited and inconsistent with other implementations. Furthermore, many operating systems do not presently sufficiently support Unicode text encoding, which can lead to problems in preserving look and feel in international versions of software. By implementing the same high quality font rasterizer in all operating systems, many of such text-related compatibility issues would be resolved.

Therefore, it is believed that the system and method disclosed herein can be used to provide a full-featured and completely portable user interface for Java applications, having a consistent look and feel across all operating systems. Advantageously, it is not necessary to rewrite or modify the application, but simply replace the present AWT API with AWTSwing.

Figure 11:
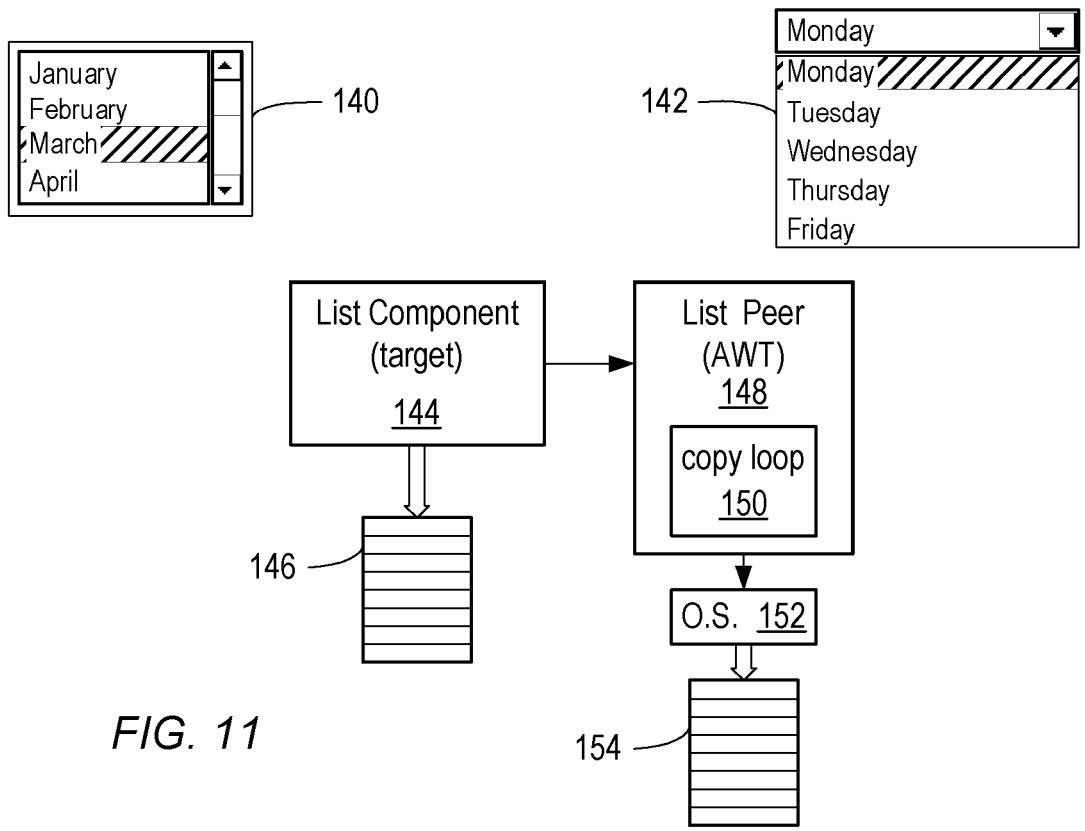
FIG. 11 illustrates the creation, under the AWT API, of redundant memory arrays to store the elements of a list-type control.

In addition to the advantages of AWTSwing described previously, such as improved look and feel consistency and code maintainability, the use of AWTSwing overcomes some of the problems and shortcomings inherent in the AWT. The legacy AWT implementation of listbox and choice controls incurs substantial overhead resulting from the fact that redundant copies are made of lists associated with these controls. This problem is represented in FIG. 11. When a listbox 140 or choice 142 control is created by an application, the application stores a list of the data represented in the control. Thus, at some point in the application program code the list component is declared 144, resulting in the allocation of a memory array 146 for storage of the list elements. Subsequently, when the control is displayed, the AWT inserts the list elements into the native control (Peer component) as well. This occurs when the AWT List Peer 148 is created. Since the AWT API is heavyweight, List Peer 148 implements the target list 144 by referencing a corresponding object in the operating system 152. To do this, the List Peer executes a copy loop 150, in which all of the items in the original memory array 146 are duplicated in a second array 154 accessed by the operating system 152. This redundant memory allocation is not a serious problem for short lists, but can waste significant time and system resources if the list is very long. In another embodiment of the system and method disclosed herein, this overhead is avoided by preventing the creation of a redundant copy of the list.

Figure 12:
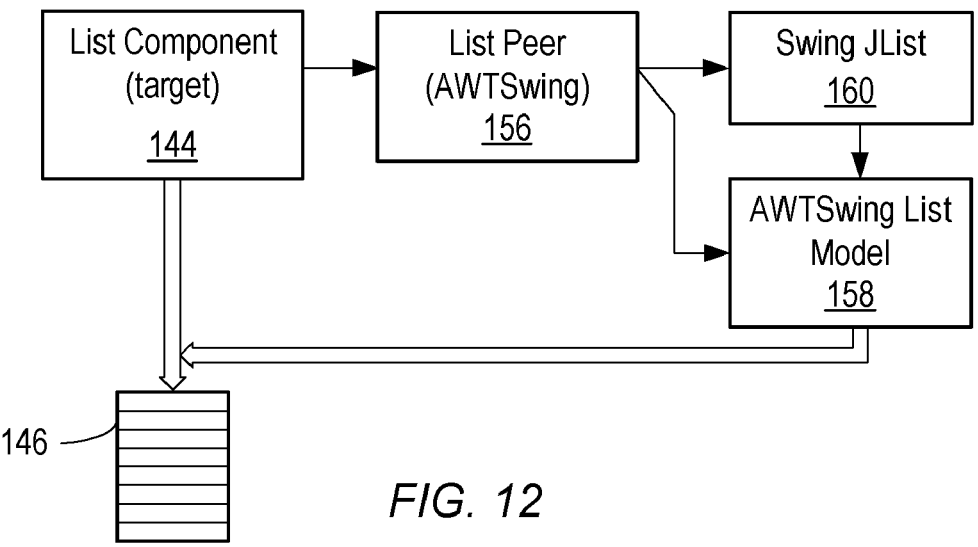
FIG. 12 illustrates the use, by AWTSwing, of a single memory array to store the elements of a list-type control.

Swing is founded on an architecture in which each object in a user interface is comprised of three communicating entities: a model, a view and a controller. The model contains the underlying logical representation of the object, the view defines the visual representation, and the controller specifies how to handle user input. Unlike the AWT Peer classes, the Swing listbox and choice controls used by AWTSwing support a model that allows the list associated with the control to be stored by the client of the Swing component (i.e., the application). FIG. 12 illustrates this use of the Swing list model. As in the legacy case, upon creation of a listbox or choice control 144 by an application, the data represented in the control are stored in a memory array 146. When the control is displayed, a list Peer 156 is created; however, this time it is a lightweight AWTSwing Peer. This lightweight Peer implements the control, not as a duplicate list obtained from the operating system, but as a lightweight Swing component 160. As described above, the behavioral model for the Swing JList allows it to refer to the original memory array 146 reserved by the application, rather than creating its own redundant copy of the array.

By substituting lightweight Peers for the choice and listbox controls, AWTSwing allows the application to utilize Swing components, rather than the heavyweight AWT components. This permits use of the Swing list model, which obviates the need for a redundant memory array in which to store the list elements. Furthermore, since the lightweight Peers interact with the legacy application in a manner consistent with the original AWT Peers, no modification of the application code is required to obtain this benefit.

There are a number of difficulties that must be resolved in order to create a seamless replacement for the AWT based on the Swing API. Some of these difficulties involve inherent limitations of Swing, while others relate to maintaining behavioral consistency with the legacy AWT controls. The following paragraphs examine these issues and describe embodiments of the system and method disclosed herein that address them.

Swing may impose some performance limitations when used to draw text or labels on a display device when executing software components having corresponding TextField and Label code. Poor performance in these areas tends to be conspicuous, since the execution of TextField and Label code are often employed in benchmark evaluations of system performance. The loss in performance is mainly attributable to two factors: Swing's overhead in drawing the text, and the priority level assigned to the text drawing operation. A further contributing factor is initialization of undo/redo support. The priority level normally assigned to text drawing events is not high. In fact, executing from a Swing-type API will cause most other objects to be executed before the API will render text on the display. As a result, the operating system frequently suspends text drawing temporarily to devote processor cycles to events with higher priority. Text drawing is typically handled by a dedicated procedure, known as a thread, which shares the processor's attention concurrently with other threads. Each time the processor suspends the text drawing thread to allow another thread to execute, it is necessary to preserve the contents of registers, memory locations, etc. containing vital text drawing information. Preserving the contents is necessary to restore the information needed, at a later time, to render the text drawing thread upon the display. The time lost by frequently saving and restoring the context of the text drawing thread detracts from the performance of text drawing in Swing.

In a further embodiment of the system and method disclosed herein, a mechanism for fast text drawing is included in two of the AWTSwing lightweight Peers: JTextFieldPeer and JFastLabelPeer. According to the system and method, the Swing components, JTextField and JLabel, are permitted to define the look and feel of the TextField and Label, respectively; however, they are not allowed to draw the text. Instead, when an application directs a Label object to draw itself, the event notification is intercepted by the AWTSwing Peer component, JFastLabelPeer. JFastLabelPeer employs its own custom code to draw the label, rather than the method belonging to the Swing object, JLabel. This results in much faster performance. In a similar manner, the JTextFieldPeer allows the Swing component, JTextField, to draw the border of the TextField, but preemptively draws the text using its own custom code. This allows the look and feel of the TextField component to be determined by Swing, but significantly accelerates the display of text. Once focus is given to the TextField, text drawing is handled by Swing in the customary manner. This allows the user to edit the content of the TextField, with the full support of Swing's editing features.

Figure 13:
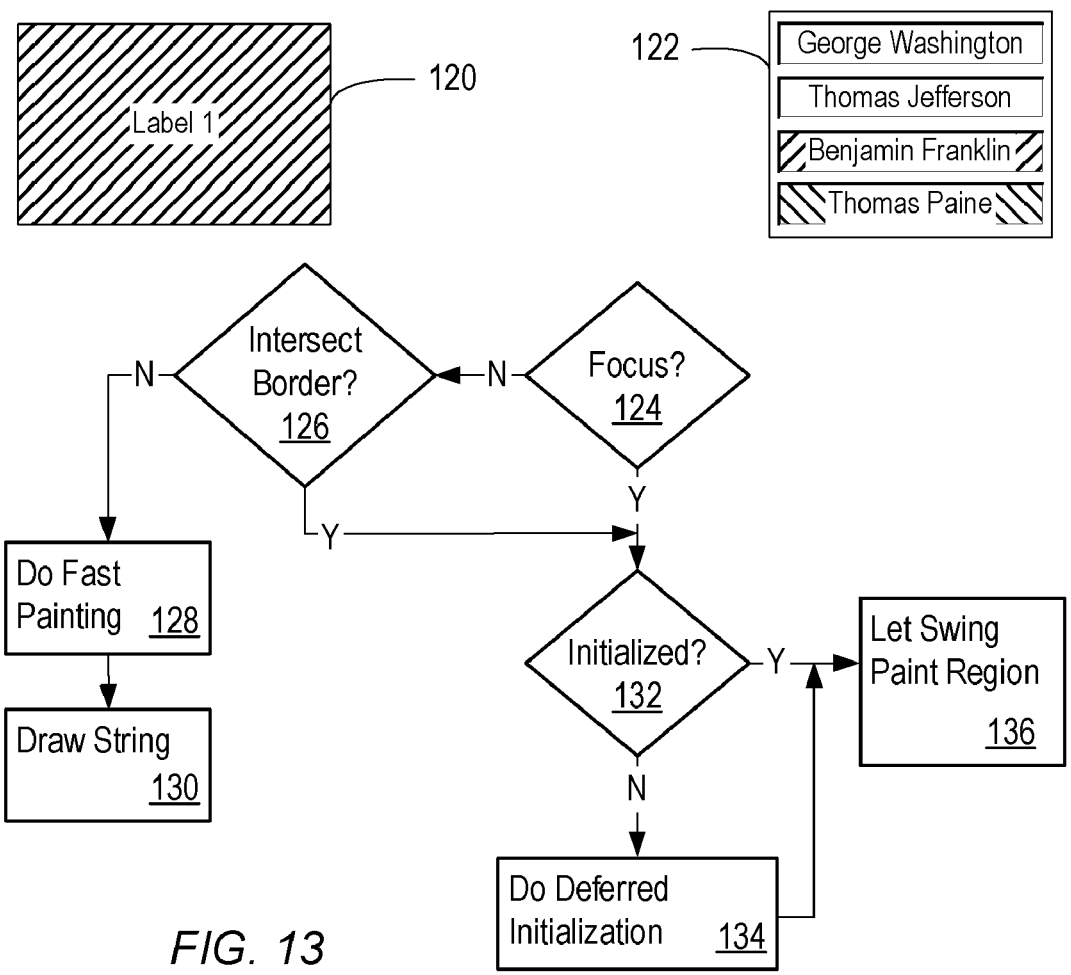
FIG. 13 represents the logic within a fast text drawing method within AWTSwing.

FIG. 13 contains a flowchart illustrating the underlying logic for the fast TextField and Label drawing. The flowchart reflects the consideration given to whether a Label 120 or a TextField 122 is being drawn. Labels are simple objects; they display text, but have no editing capability. TextFields, on the other hand, typically allow the user to enter or change the displayed text, and their graphical representations contain borders surrounding the text itself, as well as selection and cursor highlighting. Thus, TextFields are more complicated objects than Labels. While it is fairly straightforward to create an optimized text drawing routine, replacing the Swing code that draws the entire TextField is considerably more involved. Therefore, it is preferable to allow Swing to draw the TextField border, and to provide editing and undo/redo support for the TextField, once it is created. The flowchart in FIG. 13 describes how these issues are handled by AWTSwing.

The fast text drawing logic is implemented in JTextFieldPeer and JfastLabelPeer components (see FIGS. 8 and 9), and redirects calls to text drawing methods for the TextField and Label Swing controls to use an internal fast text drawing routine. The algorithm begins by determining whether the text region has the focus 124 (i.e., has been selected, using the mouse cursor). The significance of this is that the Label or TextField can only have received the focus after it has been displayed on the screen. If it has not yet received the focus, a check is made 126 to see if the region to be drawn intersects a border—in which case, the object being drawn must be a TextField (since Labels don't have borders). If not, a custom routine 128 is called to paint the background, and then display the text 130. If the region to be drawn does intersect a border, the object being executed must be a TextField, rather than a Label. Drawing is therefore delegated to Swing. First, a check is made 132 to determine whether the TextField has already been intitialized. This refers to setting up buffers and other resources required to allow Swing to support editing the TextField. Initialization is time consuming, and is deferred until after the text is first drawn by the fast text drawing routine and editing is actually requested. If the TextField has not been initialized, Swing paints the region intersecting the border 136. Also, once the TextField has been initialized, Swing does all redrawing of the TextField 136.

The fast text drawing routines described above are assigned a low event priority by a custom event handler in the JCanvasPeer class, from which both JFastLabelPeer and JTextFieldPeer are descended. The low event priority advantageously allows rapidly occurring changes in the text (as might take place during a benchmark test) to be merged with text that has previously been queued, and is waiting to be drawn. As a result of the techniques described above, the initial display and subsequent editing of text are both greatly accelerated.

Figure 14:
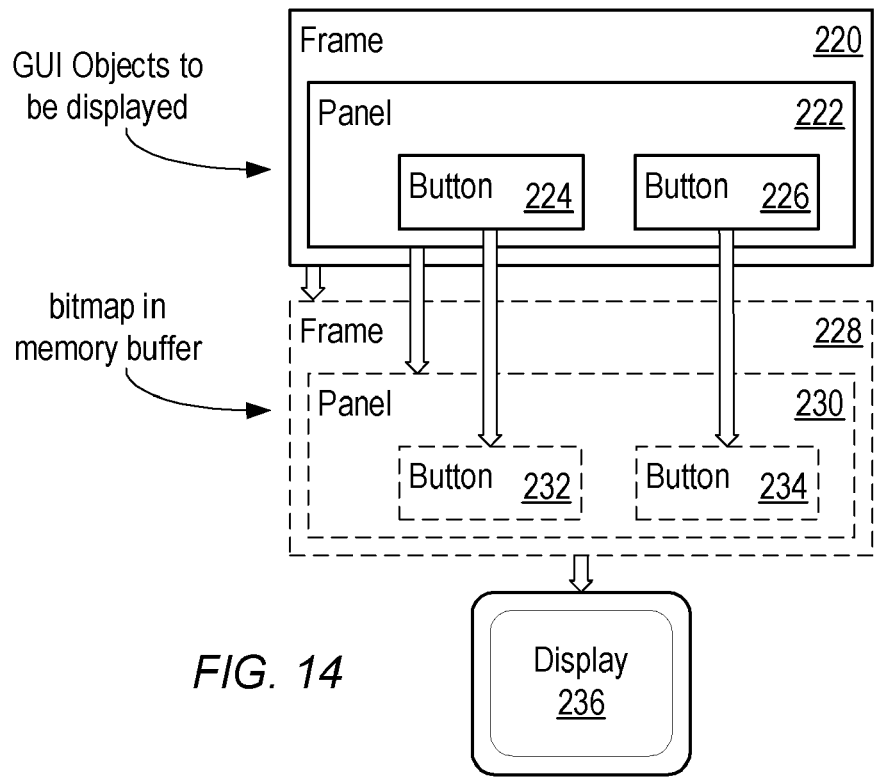
FIG. 14 illustrates buffering of image data, normally performed by the Swing API.
Figure 15:
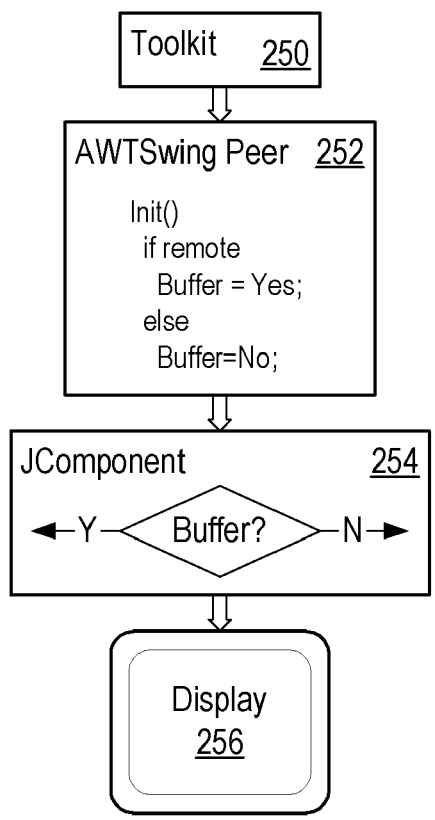
FIG. 15 depicts the method used by AWTSwing to automatically enable or disable buffering of image data, based on the display hardware configuration.

The buffering of Swing components is another area in which the performance of the Swing API suffers. Swing defaults to buffering its output—i.e., instead of directly displaying graphics content, it is first drawn to an image buffer, and the entire buffer is then displayed en masse. An example of this is presented in FIG. 14. Depicted in FIG. 14 is a Frame 220, containing a panel 222, which in turn contains two Buttons 224 and 226. Ordinarily, when Swing displays the Frame, it first redraws it to a buffer in memory. When this happens, the Frame and its contents are reconstituted as bitmaps, in a sequence based on their z-order. In other words, a bitmap of the Frame 228 is first placed in memory, followed by a bitmap of panel 230, and then bitmaps of the Buttons 232 and 234. Finally, the composite bitmap is sent to the display 236. What this means is that a bit-map of a child may displace a bit-map of a parent, so that, for example, only the pixels for Buttons 232 and 234 will appear in the layout area of interest on the display, and not the pixels for the underlying panel 230, where the Buttons exist. Accordingly, the display will not present the Frame, then the panel on top of the Frame, and then the Buttons on top of the panel.

Depending on the circumstances, buffering may result in sub-optimal performance. For example, if several Swing objects are present within multiple levels of containment in a layout, the overhead associated with buffering may defeat the hardware acceleration capability of video graphics hardware within the computer. This would then result in a slower-than-necessary display of the objects. On the other hand, buffering may be advantageous in a system involving remote displays. Rather than sending the graphic representation for each object in the layout to a remote terminal in the sequence in which the objects are drawn, it may be faster in such cases to draw the entire layout to a local buffer, and then send the buffered contents in a single transmission, thereby minimizing network traffic and bandwidth.

In yet another embodiment of the system and method disclosed herein Swing's output buffering may be dynamically enabled or disabled. AWTSwing provides access to this capability to allow the application programmer to judiciously employ buffering in situations where it will enhance graphics throughput. A modification to the Toolkit 250 within the JVM creates a custom attribute for instances of the JComponentPeer 252, by virtue of which they are aware whether the Java application responsible for their creation is operating in remote or direct mode. In other words, the Peer knows whether the GUI images are to be presented on a local display device, or on one that is physically remote (i.e., accessed over a network). In the latter case, buffering is advantageous; otherwise, it is not. As mentioned above, the Swing JComponent 254 is adapted to enable or disable buffering, and this capability is inherited by the Peer (as a JComponent subclass). JComponent 254 is the same as that shown by reference numeral 50 in FIG. 4. Under AWTSwing, when the JComponentPeer (similar to item 84 of FIG. 8) for each of the displayed controls is created, buffering is automatically enabled or disabled, according to the local/remote configuration of the graphics display system 256. Note that this is done without intervention by the application programmer, and with no modification to the application program code.

There is a further limitation of Swing that becomes a problem when Swing is employed to replace the AWT in legacy applications that use both Swing and the AWT. The look and feel settings in Swing are global—so, when one window changes the look and feel settings, then the change affects all the other windows in the JVM, too. Consider the case in which a legacy application uses some of the AWT-based controls, which inherit the look and feel of the operating system, while also using Swing-based controls, which adopt a different look and feel based on the global Swing settings. If this application is migrated to AWTSwing, it may be impossible to preserve the original look and feel, since the Swing controls that replace the original heavyweight controls of the AWT-type API will not preserve their previous look and feel. To deal with such legacy applications, it is desirable to have the ability to maintain more than one distinct look and feel.

Figure 16:
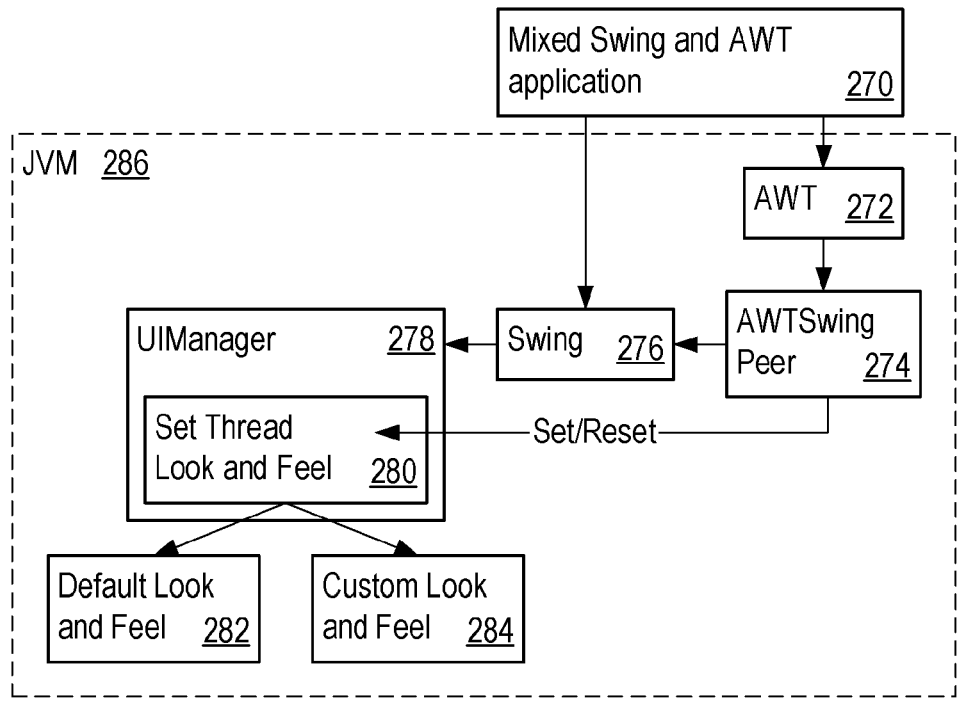
FIG. 16 illustrates the operation of an enhanced UIManager, which supports thread-relative look and feel settings.

The aforementioned need is addressed by allowing a unique look and feel to be associated with a particular thread. A further feature of AWTSwing is embodied in modifications to the UIManager, including the creation of a thread-relative setLookAndFeel method, which only accepts calls from a particular thread to adopt a prescribed look and feel. This allows individual applications to independently determine the look and feel of the Swing components they use when the components are created. If an application doesn't invoke this method when creating an object, the object simply inherits the global look and feel (which may or may not match the look and feel of the operating system). FIG. 16 contains a block diagram representing a legacy mixed AWT/Swing application program and the relevant elements of the AWTSwing API that support a thread-relative look and feel.

In FIG. 16, the application program 270 makes calls to both the AWT-type API 272 and the Swing-type API 276. Both APIs operate within the JVM 286. As previously described, the AWT calls are redirected to Swing components by AWTSwing lightweight Peers 274. The UIManager 278 includes a custom method 280 for setting and resetting the look and feel, dependent on the current thread identifier. As previously explained, when application 270 needs to display a graphical control, an AWTSwing Peer 274 is created. To properly display the control, the Peer requests the current look and feel from the UIManager, by calling a standard method 280. Based on the thread identifier of the application, the UIManager returns either the default look and feel 282 or a custom look and feel 284 associated with the application. Thus, the same control created by two different threads can be rendered with distinct look and feel characteristics. The thread-relative look and feel functionality of the UIManager can be enabled and disabled by the AWTSwing Peers. If a request for the current look and feel is made to the UIManager while the thread-relative capability is disabled, the default settings are always returned.

The AWTSwing Peers enable the thread-relative mode when they query the UIManager to get the look and feel settings for a control about to be created, and then immediately disable it. Therefore, legacy AWT-based controls are displayed by AWTSwing API with their original look and feel, i.e., the customer look and feel 284. However, when the mixed AWT/Swing legacy application program uses Swing directly to display a control, no AWTSwing Peer is involved. Consequently, the Swing controls are always displayed with the default look and feel settings.

Another Swing-related limitation appears when Swing-based Java applications are ported to the OS/2 operating system, since the JVM for OS/2 does not support an OS/2 look and feel. This causes inconsistency between the OS/2 version of the application and versions running under other operating systems. Moreover, the look and feel of the Java application is also inconsistent with that of the other applications in the OS/2 system (which use the OS/2 windowing system). If the AWTSwing API is used, there are a number of options for achieving OS/2 look and feel consistency for Java applications under the OS/2 operating system.

1. A completely new look and feel, different from that of OS/2, but consistent with an IBM corporate UI strategy, could be used. This would require the creation of entirely new graphic representations for all the Swing components.
2. A complete recreation of the OS/2 look and feel could be incorporated within AWTSwing. As with the previous option, this would also require entirely new graphics for all Swing components.
3. A partial OS/2 look and feel. The appearance and behavior of AWT-based controls would be preserved, and reasonable similarity to OS/2 look and feel would be provided for Swing-based controls.

Because AWTSwing maintains behavioral compatibility with the AWT controls used in legacy applications and has support for thread-relative look and feel, the AWTSwing developer for an OS/2 product may choose any of the above solutions to provide an OS/2 look and feel for Swing-based applications. In yet another embodiment of the system and method disclosed herein, the AWTSwing API supports at least one of the above versions of an OS/2 look and feel for the Swing components.

The behavior of certain controls in Swing is not completely consistent with the behavior of their AWT counterparts. Strictly speaking, this is not a limitation of Swing, but an issue that has to be addressed in order to achieve the desired seamless replacement of AWT by AWTSwing. In particular, the architecture of the TextField component in AWT differs from the architecture of the JTextField and JPasswordField in Swing. Consequently, a creative approach to the design of the TextField Peer in AWTSwing is required to maintain the behavioral compatibility of TextField controls, as required for the support of legacy applications. In yet another embodiment of the system and method disclosed herein, AWTSwing provides mode-switching capability in the TextField component. The manner in which this is achieved is described below.

Figure 17:
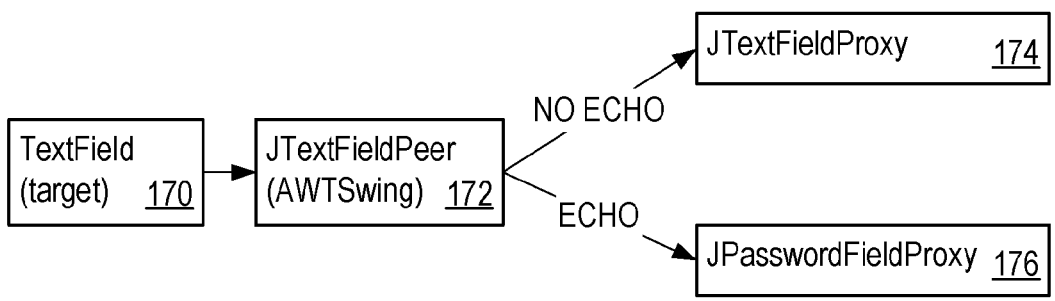
FIG. 17 represents the alternation of two Swing controls to emulate the functionality of a legacy TextField control.

In AWT, the TextField component can be used as both a normal text field and a password-protected field. If an echo character is specified for the text field, the characters of a user-entered password will not be displayed as they are keyed in, but will instead be overwritten by the echo character. This prevents someone else from easily learning the password by surreptitiously observing the user enter it. In Swing, the normal and password-protected behaviors are not shared by a single component, but separately allocated to the JTextField and JPasswordField components. To emulate the TextField in the AWT, however, these components must be deployed differently from the other lightweight Swing components. This is represented in FIG. 17.

Normally, Swing components are created only during the construction of the Peer object. However, in order to reproduce the behavior of the legacy AWT-based TextField control 170, JTextFieldPeer 172 must dynamically switch between the two Swing objects when the mode of use changes. This is accomplished by creating a new JTextFieldProxy 174 or JPasswordTextFieldProxy 176 object, depending on the settings of the echo character, and transferring the properties from the old to the new component. The appropriate Swing component is in effect "switched in" as a functional replacement for the AWT TextField, according to its mode of use. For example, if a legacy application is using an AWT TextField without password protection, no echo character is set. In this case, the AWTSwingJTextFieldPeer uses the Swing TextField component. Now, if the legacy application activates password protection, the AWT TextField will be assigned an echo character. When this occurs, the JTextFieldPeer creates an instance of Swing's JpasswordField component and substitutes it for the original AWT TextField control. This is done dynamically, so that each time the application changes the echo character status, the appropriate Swing replacement object (JTextField or JPasswordTextField) is created and used to replace the previous replacement object. Thus, the mode-switching capability of AWTSwing permits two Swing components to alternate as replacements for an AWT TextField component, depending on the manner in which the AWT TextField is being used by the application.

A flowchart representing the logic for dynamic TextField mode switching is presented in FIG. 18. Upon entry 192, the algorithm tests 178 the status of the echo character. If there has been no change in the state of the echo character, then whichever Swing control is currently in use (either JTextField or JPasswordField) is retained, and nothing needs to be done 190. On the other hand, if the echo status has changed, then it is necessary to swap the JTextField Swing component for a JpasswordField Swing component, or vice-versa. Before making this switch, the state (color, position, text, etc) of the control that is presently being displayed is saved 180. Once this information is captured, the current object can be destroyed 182, and its alternate created 184. After it is initialized 186, the previously saved state is applied to the newly created Swing component, and the procedure is finished 190.

AWTSwing employs a different color inheritance behavior than that employed by the AWT. This change is necessary, in order to maintain compatibility with legacy AWT-based applications and still allow Swing to set the look and feel of the user interface. For AWT-based Java applications, if the background color for a control is not explicitly set, it is inherited from the control's parent. For example, a Button appearing on a panel will automatically be assigned the same background color as the panel, unless the Button color has been expressly declared. The color inheritance scheme for AWT is illustrated in FIG. 19a. FIG. 19a depicts a Frame 200 containing a Label 202. The Frame has a background color assignment 204. If the background color is not explicitly defined (i.e. color setting =NULL), the Label 202 inherits its background color from its parent (i.e., the Frame 200).

In contrast to this practice, it is normal for controls in Swing-based Java applications to receive their background color assignment from global look and fell settings in Swing (if it is not explicitly declared). Consequently, when upgrading from AWT to AWTSwing, the color inheritance mechanism must be modified to allow the background and foreground color of controls to be set by Swing, while also preserving the capability for controls to inherit this setting from their parent in legacy applications.

In yet another embodiment of the system and method disclosed herein, this is accomplished by adopting the following color inheritance order:

1. If the background color for the control is explicitly declared, AWTSwing uses this setting to display the control.
2. If the background color for the control is not explicitly declared, AWTSwing attempts to get the color from the Swing settings.
3. If the background color for the control is not explicitly declared, and is not available from Swing settings, AWTSwing displays the control using the background color of the control's parent.

This inheritance scheme allows normal inheritance of background color from the global look and feel settings in Swing. However, it defaults to the AWT scheme of inheritance from the parent when these global settings are unavailable. An explicit declaration of the control's background color overrides either type of inheritance. Furthermore, this color inheritance mechanism offers considerable flexibility in displaying components created by legacy applications. When a control must inherit its background color from its parent, either the parent of the original AWT-based object, or that of its Swing counterpart can be used. This option is made possible by the replacement of AWT-based heavyweight Peers by AWTSwing proxy components, discussed earlier. A diagram representing the new color inheritance scheme appears in FIG. 19b.

FIG. 19b shows a Frame 200 and Button 202, with their respective color properties 204 and 206. In this case, if the method call to get the background color setting 206 of the Button 202 returns a NULL, it is directed by the JButtonPeer 208 to the JButtonProxy 210. Since JButtonProxy is a Swing component, its color setting is inherited from the Swing JButton class 212, of which it is a subclass. If the background color setting 214 for Swing is also undefined, JButtonProxy returns the background color 204 of the Button's parent (i.e., the Frame 200).

Providing this new color inheritance mechanism in AWTSwing requires the creation of a new method, which can be invoked to return the background color declaration (if any) of a given component, the Swing settings for the background color of the component, or the background color of the component's parent. The standard Swing getBackground method is insufficient for this purpose, since it automatically returns the background color of the component's parent when there is no explicit declaration for the component.

In addition to resolving problems such as those described above, the system and method disclosed herein provide enhanced graphics functionality, exceeding that of many targeted operating systems. In yet another embodiment of the system and method disclosed herein, an enhanced feature set, consisting of features from operating systems with sophisticated GUIs may be incorporated into AWTSwing. This enhanced feature set would then be available to Java applications running under the operating system into which AWTSwing is installed. For example, the GUI built into the Windows operating system allows the use of pop-up menus, with editing and undo/redo support. This is a very helpful feature for a user interface, but is not available in the Unix operating system. However, a programmer could include pop-up menus in the user interface for his application, and port the application to a Unix system using AWTSwing, where the pop-up menus would be displayed exactly as they appear on the Windows-based computer in his office.

The Accessibility Bridge is another built-in feature of the Windows operating system, which allows a visually handicapped user to selectively magnify portions of the computer screen to improve visibility. AWTSwing makes this capability available as an enhancement to legacy AWT-based programs, not just Swing programs, and it does so without requiring a change in the application. Accessibility features available in Swing become generally available to legacy AWT applications.

The comprehensive feature set of AWTSwing is available to an application program, despite limitations in the graphics resources of the operating system under which the program executes. For example, Motif is a GUI guideline and development toolkit for the X Window System. As such, Motif defines the standard GUI look and feel for most UNIX-based operating systems and their applications. Although the quality of the choice control (a type of ListBox) in Motif is poor, a Java application supported by AWTSwing in Unix renders a much higher quality choice control, consistent with the more attractive look and feel of an operating system like Windows.

The processing and display of text is a major area of inconsistency between different operating systems. As mentioned earlier, Unicode text encoding is not supported in many operating systems. This is a significant disadvantage when trying to maintain a consistent look and feel in software with international versions, requiring foreign character sets and complete simultaneous coverage of international character sets. In legacy AWT-based systems, characters are converted to localized encodings before the text is rasterized. This can result in inconsistent or inaccurate text renderings. Moreover, the AWT-based text controls are capable of using only one font at a time. Therefore, complex strings, containing characters from two or more fonts, will often be incorrectly rendered.

A further capability of AWTSwing, not present in some operating systems, is font searching. In order to display text, the operating system mustrasterize the characters used in the text. This involves associating with each character an arrangement of graphic shapes (called glyphs) with the character, that constitute its screen representation. For example, the glyph for the letter "H" is composed of two vertical strokes joined by a horizontal stroke. Note that various glyphs may be chosen to rasterize a character, depending on the style and typeface of the text. For instance, a different set of glyphs would be used to represent text in a bold Courier typeface than in italicized Garamond. When font searching is enabled, an operating system searches a set of fonts for the necessary characters. This enables complex strings, containing characters from two or more fonts, to be drawn correctly. Advantageously, AWTSwing provides this enhanced capability independently of the operating system, because all text drawing is through Java and does not utilize the platform-specific controls.

It will be appreciated by those skilled in the art having the benefit of this disclosure that this invention is believed to present an API for the creation of a platform independent GUI for Java applications, and which can replace the heavyweight API used by legacy applications without having to modify the application. Further modifications and alternative embodiments of various aspects of the invention will be apparent to those skilled in the art in view of this description. Such details as the exact composition of the enhanced feature set, or the number of AWTSwing Peer classes as described herein are exemplary of a particular embodiment. It is intended that the following claims be interpreted to embrace all such modifications and changes and, accordingly, the specification and drawings are to be regarded in an illustrative rather than a restrictive sense.

What is claimed is:

1. A system of software components stored on a computer-readable medium adapted to display an object created by an application program running under an operating system by reproducing the behavior of legacy AWT-based controls by switching between swing controls, wherein the system of software components comprises:
   a first swing proxy component;
   a second swing proxy component;
   a peer component for selecting either the first proxy component or the second proxy component, depending on a mode of use of the object, where selection is based upon which swing component is capable of supporting the mode of use, wherein the selection can be made during runtime, and wherein after the proxy component is selected, the selected proxy component dynamically creates a new graphics resource component for displaying the object, such that the appearance of the displayed object is substantially independent of the operating system.

2. The system as recited in claim 1, wherein the object is part of a graphical user interface associated with the application program.

3. The system as recited in claim 1, wherein the application program controls the selection of the first or second proxy components by sending an indication of the mode of use to the peer component.

4. The system as recited in claim 3, wherein the new graphics resource component is created during runtime upon selection of the first or second proxy components to replace a graphics resource component previously created for displaying the object.

5. The system as recited in claim 4, wherein the previously created graphics resource component is destroyed once replaced by the new graphics resource component.

6. The system as recited in claim 4, wherein the appearance and behavior of the object differ depending on whether the object is displayed through the selection of the first or second proxy components.

7. The system as recited in claim 6, wherein the graphics resource components are included within a set of software components forming the Swing application program interface (API).

8. The system as recited in claim 7, wherein the first proxy component is configured for displaying the object using a Swing JTextField graphics resource component, and wherein the second proxy component is configured for displaying the object using a Swing JPasswordField graphics resource component.

9. The system as recited in claim 1, wherein the application program is written in Java programming language.

10. The system as recited in claim 1, wherein the operating system comprises a Windows, Unix or OS/2 computer operating system.

11. The system as recited in claim 1, wherein the selection of the first or second proxy components depends on a status of a software flag sent to the peer component as an indication of the mode of use.

12. The system as recited in claim 11, wherein the object is adapted to respond to text entry events and wherein the status of the software flag indicates whether or not a special character is echoed when text is entered.

13. A method for displaying an object created by an application program running under an operating system, by reproducing the behavior of legacy AWT-based controls by switching between swing controls, using at least one of a system of software components stored on a computer-readable medium, which can be invoked during runtime to generate a graphical representation of the object that is substantially independent of the operating system, the method performed by the application program and comprising:
   activating a first swing proxy component of the system of software components to dynamically generate a first graphical representation of the object during runtime;
   monitoring the mode of use of the object; and
   upon detecting a change in the mode of use of the object, if it is detected that the activated proxy is not capable of supporting the new mode of use, deactivating the first swing proxy component and activating a second swing proxy component of the system of software components to dynamically generate a second graphical representation of the object during runtime, wherein the second graphical representation is distinct from the first.

14. The method as recited in claim 13, wherein the object is part of a graphical user interface associated with the application program.

15. The method as recited in claim 13, further comprising selecting the first or second software components by the application program.

16. The method as recited in claim 15, further comprising creating a new graphics resource component for generating the second graphical representation, wherein the new graphics resource component is created during runtime when the second software component is selected by the application program.

17. The method as recited in claim 16, further comprising destroying an old graphics resource component, which was previously created for generating the first graphical representation, when the first software component is no longer selected.

18. The method as recited in claim 17, wherein the graphics resource components are included within a set of software components forming the Swing application program interface (API).

19. The method as recited in claim 18, wherein the first software component is configured for displaying the object using a Swing JTextField graphics resource component, and wherein the second software component is configured for displaying the object using a Swing JPasswordField graphics resource component.

20. The method as recited in claim 13, further comprising varying the appearance and behavior of the object, depending on whether the object is displayed during activation of the first or the second software components.

21. The method as recited in claim 13, wherein the application program is written in Java programming language.

22. The method as recited in claim 13, wherein the operating system comprises a Windows, Unix or OS/2 computer operating system.

23. The method as recited in claim 13, further comprising selecting either the first or the second software component, depending on a status of a software flag associated with the object.

24. The method as recited in claim 23, further comprising the object responding to text entry events, and the software flag indicating whether or not a special character is echoed when text is entered.

25. A computer-readable storage device, comprising:

a windows-based operating system;

an application program running under the operating system;

an object created at runtime by the application program and adapted for multiple modes of use by the application program, wherein the application program is adapted for:

reproducing the behavior of legacy AWT-based controls by switching between swing controls;

activating a first swing proxy component of the system of software component to dynamically generate a first graphical representation of the object during runtime;

monitoring the mode of use of the object, and upon detecting a change in the mode of use of the object, if it is detected that the activated proxy is not capable of supporting the new mode of use, deactivating the first swing proxy component and activating the second swing proxy component to dynamically generate a second graphical representation of the object during runtime, wherein the second graphical representation is substantially independent of the operating system and distinct from the first graphical representation.

* * * * *